United States Patent [19]

Fuyama

[11] Patent Number: 5,363,296
[45] Date of Patent: Nov. 8, 1994

[54] ELECTRONIC CASH REGISTER HAVING MACRO-KEYS

[75] Inventor: Seiji Fuyama, Yokohama, Japan

[73] Assignee: Matsushita Electric Industrial Co., Ltd., Osaka, Japan

[21] Appl. No.: 142,064

[22] Filed: Oct. 28, 1993

[30] Foreign Application Priority Data

Mar. 3, 1993 [JP] Japan ................................. 5-042499

[51] Int. Cl.⁵ ............................................. G06F 15/21
[52] U.S. Cl. ................................................... 364/405
[58] Field of Search ............... 364/405, 404, 400, 401, 364/189

[56] References Cited

U.S. PATENT DOCUMENTS

| | | | |
|---|---|---|---|
| 4,264,782 | 4/1981 | Konheim | 364/200 |
| 4,326,098 | 4/1982 | Bouricius | 380/25 |
| 4,425,619 | 1/1984 | Matsuda et al. | 364/405 |
| 4,450,526 | 5/1984 | Nakatani et al. | 364/405 |
| 4,484,277 | 11/1984 | Uesugi | 364/405 |
| 4,964,075 | 10/1990 | Shaver et al. | 364/900 |
| 5,189,608 | 2/1993 | Lyons et al. | 364/408 |

FOREIGN PATENT DOCUMENTS

| | | |
|---|---|---|
| 2-53198 | 2/1990 | Japan . |
| 4-257994 | 9/1992 | Japan . |
| 4-308994 | 10/1992 | Japan . |
| 4-315293 | 11/1992 | Japan . |
| 2254468 | 10/1992 | United Kingdom . |

*Primary Examiner*—Donald E. McElheny, Jr.
*Attorney, Agent, or Firm*—Spencer, Frank & Schneider

[57] ABSTRACT

An electronic cash register which includes a keyboard having macro keys of a plurality of key functions to be combinedly specified and device of recognizing a state of the electronic register, and wherein macro key information corresponding to each of the macro keys includes key code information indicative of a sequence of the key codes to be executed when the macro key is designated and a check code for inspection of conditions allowing execution thereof, and wherein, when the electronic register accepts the key code corresponding to the macro key from the keyboard and at the same time when the state of the electronic register recognized by the recognition means satisfies the conditions specified by the check code corresponding to the macro key, the register converts the sequence of the key code into an executable instruction, whereby a predetermined macro key instruction enables an authorized operator to operate the electronic register at a predetermined time and in predetermined conditions.

19 Claims, 23 Drawing Sheets

| WORK AREA | 3-1 |
| OPERATOR INFORMATION FILE | 3-2 |
| MACRO KEY INFORMATION FILE | 3-3 |
| ITEM INFORMATION FILE | 3-4 |
| REPORT DATA FILE | 3-5 |

|  | 7-1 ID | 7-2 MANAGER LEVEL | 7-3 NAME |
|---|---|---|---|
| OPERATOR #1 | 0123 | 0 | JACK |
| 2 | 0110 | 1 | BOB |
| 3 | 0008 | 1 | JIM |
| ⋮ | ⋮ | ⋮ | |
| 15 | 1245 | 2 | WILL |

FIG. 17

| 17-1 | 17-2 | 17-3 | 17-4 | 17-5 | |
|---|---|---|---|---|---|
| YEAR | MONTH | DAY | DAY OF THE WEEK | HOUR | MINUTE |

FIG. 18

FUNCTION CODE 18-1　　18-2 TIME RANGE DATA

| 92 | 0930 | 1000 | (9:30~10:00) |
|---|---|---|---|
| 92 | 1130 | 1230 | (11:30~12:30) |
| 92 | 2200 | 2300 | (22:00~23:00) |

FIG. 19

FUNCTION CODE 19-1　19-2 DATA OF DAY OF THE MONTH

| 93 | 01 | (1ST DAY) |
|---|---|---|
| 93 | 15 | (15TH DAY) |
| 93 | 30 | (30TH DAY) |

FIG. 20

FUNCTION CODE 20-1　20-2 DATA OF DAY OF THE WEEK

| 94 | 01 | (MONDAY) |
|---|---|---|
| 94 | 05 | (FRIDAY) |
| 94 | 07 | (SUNDAY) |

FIG. 21

| FUNCTION CODE 21-1 | 21-2 | PRINTER COMMANDS |
|---|---|---|
| 95 | 01 | RECEIPT STOP MODE |
| 95 | 02 | RECEIPT PRINT MODE |
| 95 | 03 | JOURNAL STOP MODE |
| 95 | 04 | JOURNAL PRINT MODE |

FIG. 22

| FUNCTION CODE 22-1 | 22-2 | RECEIPT PRINTER CHECK CODE |
|---|---|---|
| 96 | 01 | RECEIPT SET CHECK |

FIG. 23

| FUNCTION CODE 23-1 | 23-2 | DRAWER STATE CHECK CODE |
|---|---|---|
| 97 | 01 | DRAWER OPEN CHECK |

```
SLIP NO. 1234
            JAN. 15  1993
  1 COFFEE      300
  2 BEER        700
  1 BEEFSTEAK  2200
    SBTL       3200
    TAX         320
    TOTL       3520
```

STORAGE BUFFER OF KEY OPERATION TIME IN WORK AREA (15:25 ON JANUARY 17 (SUNDAY), 1993)

ELECTRONIC CASH REGISTER HAVING MACRO-KEYS

BACKGROUND OF THE INVENTION

1. Field of the Invention

The present invention relates to an electronic cash register having macro keys.

2. Description of the Related Art

In a conventional electronic cash register having macro keys, functions settable for the macro keys are limited to key code information on a keyboard of the electronic cash register, in particular, to the execution of combinations of a plurality of key processings priorly assigned to the keys present on the keyboard.

The inventor of the present application has disclosed in JP-A-4-308994 (laid-open on Oct. 30, 1992) an electronic cash register which comprises a keyboard, a memory, a setting means, a display and an arithmetic operation processor, the keyboard having macro keys together with such general keys as ten-key, item registration keys and a total key and so on, and wherein, when one of the keys is operated, a corresponding key code is generated and transmitted to the arithmetic operation processor so that the memory stores therein macro key setting data, a message setting file, and a check code corresponding to the macro key through the setting means. Such check codes include a mode check code, a mode set code, a terminal ID check code, an operator ID check code, a message display code, a macro key code and a pause code, and function to assign items to be checked for the macro keys. When it becomes clear on the basis of, e.g., a mode switch, an operator ID switch or the internal information of the arithmetic operation processor, that an inspection object assigned by a check code is already put in its predetermined state, the key code is transferred to a work area of the arithmetic operation processor to execute the operation assigned by the macro key. Meanwhile, when it becomes clear that the inspection object is not put in the predetermined state yet, the execution of the operation is stopped and an associated message stored in the memory is informed to the operator on the display.

An electronic cash register invented by the same inventor as mentioned above in accordance with the present invention can perform the following functions (1) to (7), which would not be realized in prior art electronic cash registers having macro keys.

(1) Utilizing a mode check code, when a macro key is operated the operational mode of the electronic cash register is checked so that, only when the operational mode is a specific operational mode, the corresponding macro key is set valid.

(2) Utilizing a mode set code, when a macro key is operated the operational mode of the electronic register is changed to a predetermined operational mode so that a key operation function valid only for the operational mode is set valid for the operation of the macro key.

(3) Utilizing a terminal ID check code, when a macro key is operated the ID of a terminal connected to the electronic register is checked so that, only when the electronic register is connected to a predetermined terminal, the operation of the macro key is set valid.

(4) Utilizing an operator ID check code, when a macro key is operated the ID of an operator who is operating the electronic register is checked so that, only when the electronic register is being operated by a predetermined operator, the operation of the macro key is set valid.

(5) Utilizing a message display code, when a macro key is operated a message corresponding to the macro key is displayed on a display device.

(6) Utilizing a macro key code, when a macro key is operated another macro key code is set as macro key data corresponding to the former macro key to link a plurality of macro key data.

(7) Utilizing a pause code, when a macro key is operated after an input is accepted from the keyboard, the associated operation is processed and then macro key data corresponding to the macro key is processed.

However, conventional electronic cash registers having macro keys utilized in the office processing field including the aforementioned electronic cash register disclosed by the same inventor may be operated by certain assigned operators in any cases inspite of differences in importance of operation resulting from property of the operation and in designation of manager level for the operation. For this reason, it has been difficult to secure suitable sales management, property preservation, etc.

Also disclosed by Sasaki in JP-A-4-257994 is an electronic cash register in which a person-in-charge key is combined with a person-in-charge code to secure a productivity and to allow particular operation of a particular person. That is, Sasaki's electronic cash register is arranged so that a unique person-in-charge key is assigned to a predetermined person in charge and only when a code coinciding with the person-in-charge code previously stored as associated with the exact person-in-charge key is entered, the person can register sales data in the register. Since the Sasaki's register can be operated only by the person in charge assigned to the same register, it is impossible for managers assigned for each of the different operations according to necessity of the register or a plurality of managers having a predetermined level assigned for each of the different operations to operate a plurality of registers.

Also disclosed by Sugita in JP-A-2-53198 is an electronic cash register which comprises, in addition to a first memory means for making usual programs permanently resident therein, a second memory means, and wherein one of programs stored in an external memory is selected based on an entered code signal and transferred to the second memory means to be executed, after which the register returns to its initial state to execute a usual program. However, Sugita's electronic cash register, though it executes programs other than the inherent programs, cannot judge the operable or nonoperable state by referring to the state of the register.

SUMMARY OF THE INVENTION

It is an object of the present invention to provide an improved electronic cash register wherein macro key functions are expanded and predetermined conditions are set according to the types of operations so that, under certain conditions, only an operator having a manager level allowed with a predetermined discretion can operate predetermined peripherals at a predetermined time.

In accordance with an aspect of the present invention, the above object is attained by providing an electronic cash register which comprises a keyboard having keys including a plurality of macro keys, means for recognizing the state of the register or the state of an operator, and a memory, and wherein key code information on the keyboard corresponding to the respective macro keys as well as codes for inspecting conditions of allowing the execution of the operations are stored, together with number of data attached to the macro keys, in areas of the memory corresponding to the macro keys, so that, prior to execution of a program, it is checked whether or not the register satisfies the conditions specified by the codes.

In accordance with another aspect of the present invention, an electronic cash register comprises a keyboard, a memory, an arithmetic operation controller and a display unit. The keyboard has keys including macro keys. When one of such keys is operated, a key code corresponding to the operated key is generated. The memory has a work area for use of internal calculation and a macro key information storage area for storage of macro key information. The macro key information includes a check code to be checked, the sequence of the key code to be executed, and a key code number to be executed when the macro key is operated. The arithmetic operation controller has setting means, information processing means, register state judging means and error processing means. The setting means previously stores the macro key information in a macro key information storage area. The information processing means has a key code decoder. When receiving a key code indicative of a macro key from the keyboard, the information processing means reads out the macro key information corresponding to the key code from the macro key information storage area and stores it in the work area. The register state judging means judges the state of the register in accordance with the check code of the macro key information stored in the work area. When the register state judging means determines that the state of the check code fails to satisfy its conditions, the error processing means skips the processing to be executed by the assignment of the macro key, issues an error signal to the display unit to inform the operator of the error, and stops the processing specified by the macro key. When the register state judging means determines that the state of the check code satisfies its conditions, the key code decoder sequentially decodes the key code sequence of the macro key information into a sequentially executable instruction.

The check code included in the macro key information is used to require the electronic register to check whether or not the manager level of the operator is higher than a predetermined manager level. The register state judging means may perform its judging operation by comparing the manager level of the operator with the manager level assigned by the check code. Further, the electronic cash register may be arranged so that the electronic register has clock means for telling time, the check code is used to require the register to check whether or not the time at which the operator operates the macro key is within a predetermined time range, and the register state judging means judges whether or not the operation time informed by the clock means is within an operation allowable time range specified by the check code.

Furthermore, the electronic cash register may be arranged so that the electronic register has calendar means for telling date, the check code included in the macro key information is a date check code which requires the register to check whether or not the date on which the operator operates the macro key is within a predetermined date range, and the register state judging means judges whether or not the operation date is within an operation allowable date range specified by the check code.

The electronic cash register may also be arranged so that the electronic register has calendar means for telling a day of the week on which the register is operated, the check code is a day of the week check code which requires the register to check whether or not the day of the week on which the operator operates the macro key is within a predetermined day of the week range, and the register state judging means judges whether or not the operation day corresponds to the day of the week assigned by the check code in question.

In addition, the electronic cash register may be arranged so that the electronic register has a printer, the check code is a print code assignment code which requires the register to check whether or not the print code of the printer is a predetermined print code, and the register state judging means judges whether or not the print code assigned by the check code coincides with the print code of the printer.

The electronic cash register may be arranged so that the electronic register has a receipt printer, the check code is a receipt assignment code which requires the register to print a receipt, and the register state judging means judges whether or not the receipt printer is put in its receipt printable state.

The electronic cash register may also be arranged so that the electronic register has a drawer for generating a release signal in its release mode, the check code is a drawer state check code which requires the register to check the release or non-release state of the drawer, and the register state judging means judges whether or not the drawer in the release state.

Further, the electronic cash register may be arranged so that the check codes included in the macro key information correspond to at least two of the plurality of check codes, and the register state judging means judges whether or not the conditions specified by the check codes are satisfied.

The electronic cash register in accordance with the present invention can set and perform the following functions.

(1) When a macro key is operated, the manager level of an operator being operating the electronic register is checked so that, only when the manager level of the operator in operation is equal to or higher than a specific manager level, the operation of the macro key in question is made valid.

(2) When a macro key is operated, the operation time of the macro key is checked so that, only when the checked operation time is within a specific time band, the operation of the macro key in question is made valid.

(3) When a macro key is operated, the operation day of the macro key is checked so that, only when the checked operation day corresponds to a specific day, the operation of the macro key in question is made valid.

(4) When a macro key is operated, the operation day of the week of the macro key is checked so that, only when the checked operation day of the week corresponds to a specific day of the week, the operation of the macro key in question is made valid.

(5) When a macro key is operated, a print mode of the printer is checked so that, only when the checked mode coincides with a specific print mode, the operation of the macro key is made valid.

(6) When a macro key is operated, a receipt ready state of the receipt printer is checked so that, only when a receipt is set in the printer, the operation of the macro key in question is made valid. That is, when a specific macro key is operated, the receipt is forcibly printed out.

(7) When a macro key is operated, the open or closed state of the drawer is checked so that, only when the drawer is in the closed state, the operation of the macro key in question is made valid. That is, this function can prompt the operator to carefully manage the drawer, which is important from the viewpoint of safety.

(8) When a macro key is operated, the operation day of the week or date of the macro key is checked so that, when the checked day of the week or date coincides with any one of a plurality of specific days of the week or dates, the operation of the macro key is made valid.

BRIEF DESCRIPTION OF THE DRAWINGS

FIG. 17 is a buffer for storing therein a key-operated date in the second, third, fourth and eighth embodiments;

FIG. 18 is a diagram for explaining a time range check code in the second embodiment;

FIG. 19 is a diagram for explaining a date check code as the macro key setting data in the third embodiment;

FIG. 20 is a diagram for explaining a day of the week check code as the macro key setting data in the fourth and eighth embodiments;

FIG. 21 is a diagram for explaining a print mode assignment code as the macro key setting data in the fifth embodiment;

FIG. 22 is a diagram for explaining a receipt check code as the macro key setting data in the sixth embodiment;

FIG. 23 is a diagram for explaining a drawer state check code as the macro key setting data in the sixth embodiment;

DESCRIPTION OF THE PREFERRED EMBODIMENTS

Figure 1:
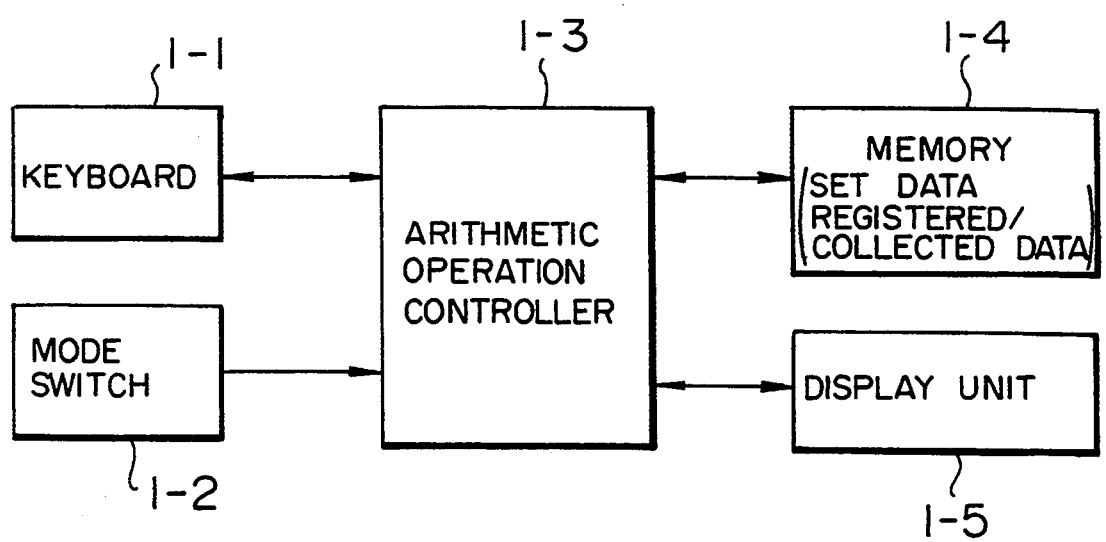
FIG. 1 is a block diagram showing an electronic cash register of a first embodiment of the present invention.
Figure 2:
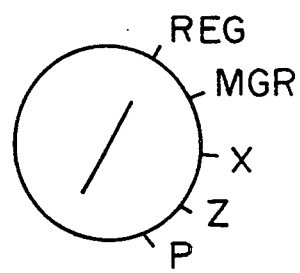
FIG. 2 is an appearance view of a mode switch 1-2 used in the first embodiment.

Embodiment 1:

FIG. 1 is a block diagram of an arrangement of an electronic cash register in accordance with a first embodiment of the present invention, which includes a keyboard 1-1, a mode switch 1-2, an arithmetic operation controller 1-3, a memory 1-4, and a display unit 1-5. Arranged on the keyboard 1-1 are such necessary keys as a ten-key, an item registration key, a total key, a subtotal key and macro keys so that, when one of such keys is operated, a key code corresponding to the operated key is generated and provided to the arithmetic operation controller 1-3. The arithmetic operation controller 1-3, which has a read-only memory (ROM) therein, stores in the ROM programs for processing various transactions or operations for the present electronic register. Connected to the arithmetic operation controller 1-3 are, in addition to the keyboard 1-1, the mode switch 1-2, the memory 1-4 and the display unit 1-5. The mode switch 1-2 is used to designate the operational mode of the electronic register such as registration (REG), manager registration (MGR), inspection (X), account adjustment (Z) or set (P). Data for the mode switch, prior to starting the respective transaction processing programs, are read out by the arithmetic operation controller 1-3. An outside appearance of the mode switch 1-2 is shown in FIG. 2. The memory 1-4 has such an interior structure as shown in FIG. 3, that is, has a work area 3-1 for interior calculation, an operator information file 3-2 for storing therein a manager level and a name in association with the ID of each operator, a macro key information file 3-3 for storing therein, when a key code entered from the keyboard 1-1 is from the macro key, macro key information for prescribing the operation of the macro key in association with the associated macro key number, an item information file 3-4 for storing therein item names and unit prices associated with respective item codes so that an item code entered from the keyboard can be read out for its item registration, and a report data file 3-5 for storing therein report data.

Figures 3, 4:
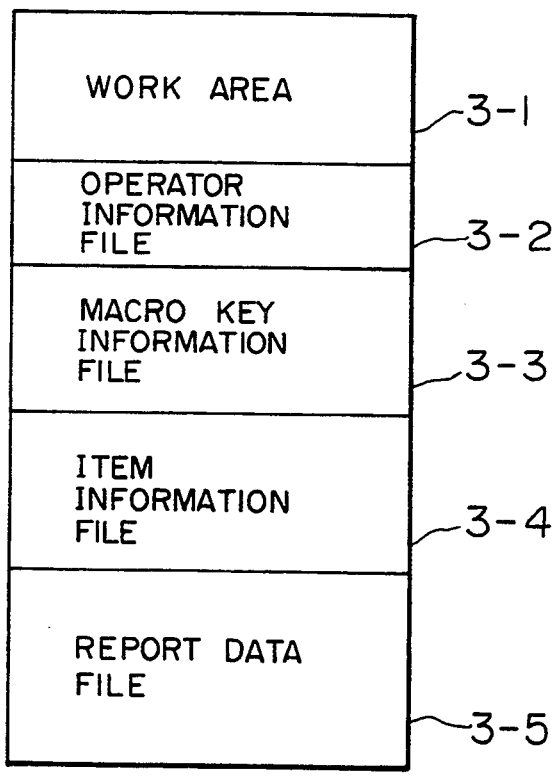
FIG. 3 shows a structure of an interior of a memory 1-4 used in the first embodiment.
FIG. 4 is a structure of a macro key setting file.

FIG. 4 shows contents of the macro key file 3-3 in the memory 1-4. In the illustrated embodiment, up to 10 macro keys can be used, and the macro key file is made up of up to 15 macro data setting fields 4-1 associated with the 10 numbers of the 10 macro keys and set data counters 4-2 for recording numbers of effective data set in the fields.

Figure 5:
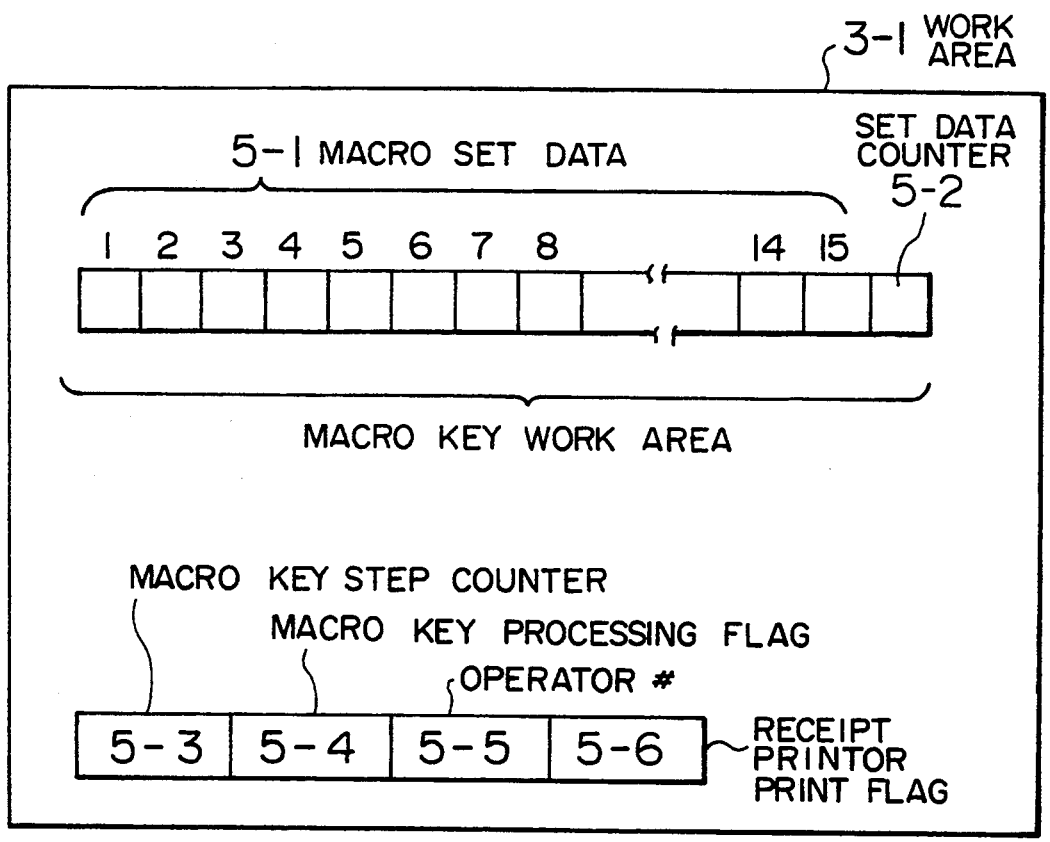
FIG. 5 is an internal structure of a work area.

FIG. 5 shows an exemplary memory map of the work area 3-1. The work area includes a macro key work area having a macro setting data 5-1 associated with the objective macro key selected from the macro key file 3-3 and also having a set data counter 5-2 and also includes an area in which a macro key step counter 5-3, a macro key processing flag 5-4, an operator number 5-5 and a receipt printer print flag 5-6 are written.

Figure 6:
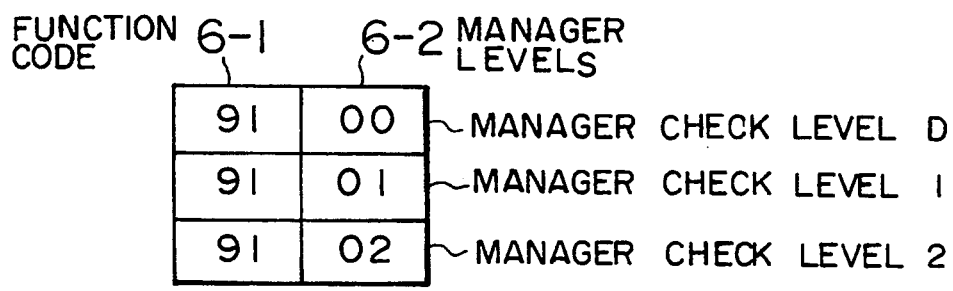
FIG. 6 is a diagram for explaining a manager level check code used in the first embodiment.

Shown in FIG. 6 is a diagram showing the structure of a manager level check code stored in the memory 1-4 as macro key information. The manager level check code comprises function code 6-1 (91) indicative of this code and manager level data 6-2 (00, 01, 02 ... )/

Figures 7, 8:
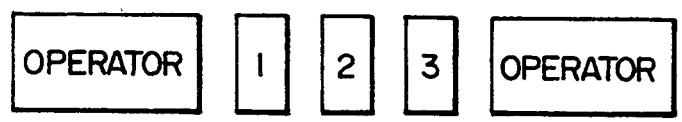
FIG. 7 is a structure of an operator information setting file used in the first embodiment.
FIG. 8 is a diagram for explaining how to operate keys to assign an operator in the first embodiment.

FIG. 7 shows a structure of the operator information file 3-2. The file in the present embodiment can contain information on 15 operators. That is, previously set in the file are IDs, manager levels and names with respect to 15 operators #1 to #15.

Explanation will be made as to the operation of the first embodiment.

Shown in FIG. 8 is an exemplary diagram for explaining the key operation of specifying an operator, in which, when an operator pushes an operator key, enters his or her ID number (123) as a secret number and then pushes the operator key to confirm the end of the code, this causes the operator #1 to be selected from the operator information file of FIG. 7 and stored in the operator #of the work area 5-5. This operator specifying operation is carried out prior to the registering operation of the register.

Figure 9:
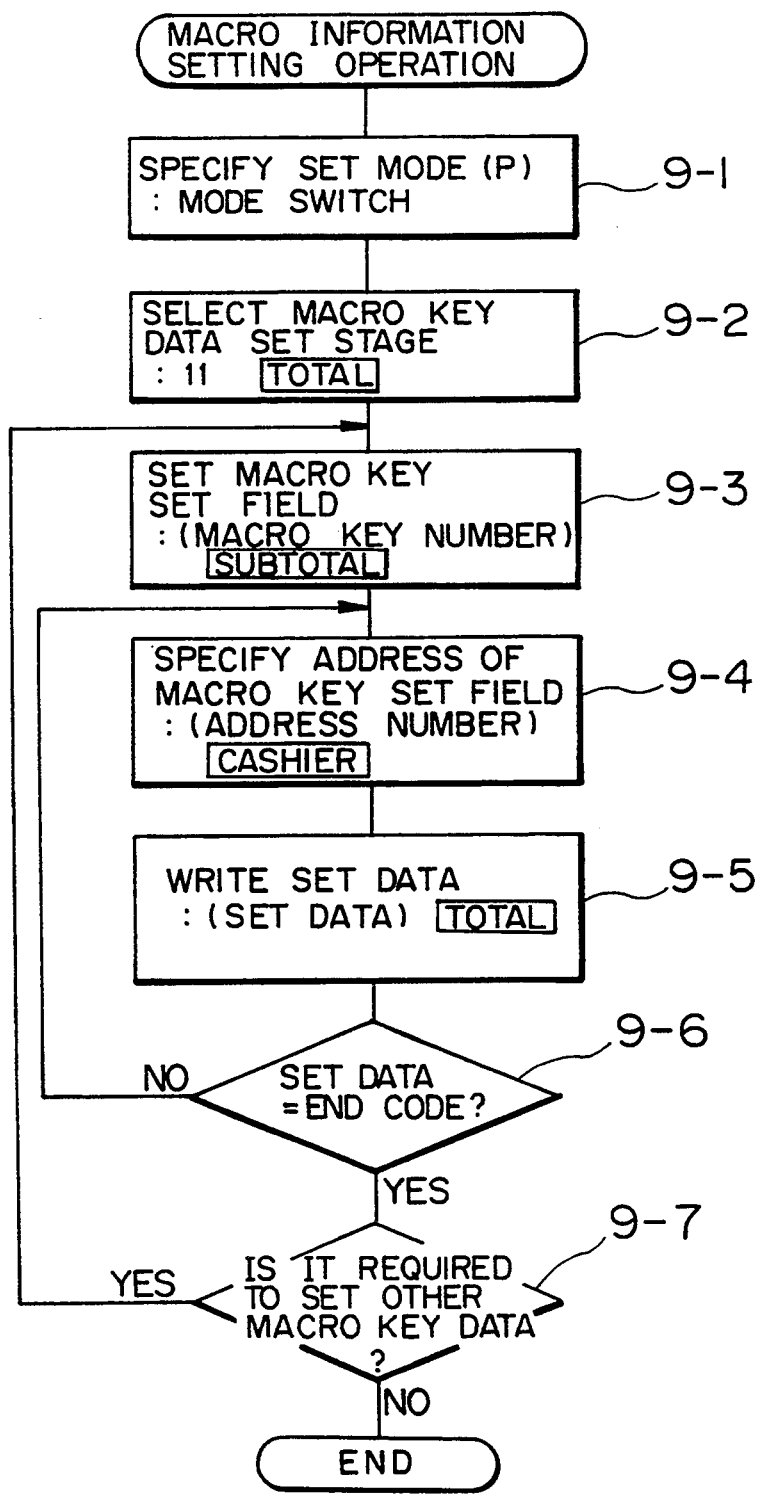
FIG. 9 is a flowchart for explaining macro key setting operation.

FIG. 9 is a flowchart for explaining an example of the operation of setting macro key information in the memory 1-4. In the present embodiment, a macro key data setting stage is specified by a number 11 as shown in block 9-2. In a set mode, TOTAL, SUBTOTAL, CASHIER, and the like keys are used for purposes other than their functions marked thereon.

More specifically, when the operator pushes the mode switch 1-2, the operation of the present electronic cash register is specified as a set mode P (step 9-1), and when the operator pushes the number 1 key twice and then the TOTAL key on the keyboard 1-1 (step 9-2), the macro key data setting stage 11 is selected. Subsequently, when the operator pushes the number 1 key and then the SUBTOTAL key (step 9-3), the macro key setting field 4-1 corresponding to the macro key number 1 is specified in the macro key setting file 3-5. Next, pushing of the number 1 key and CASHIER key (step 9-4) causes an address 1 of the macro key setting field 4-1 to be specified. Then, entering macro key data and pushing TOTAL key (step 9-5) causes the macro key data to be set at the address 1 of the macro key setting field 4-1 for the macro key number 1. When the above keying operations are repeated as shown in FIG. 9, desired macro key information can be set in the macro key information file 3-3. When specific data determined as an end code of the macro key data is set (step 9-6), the address number of the setting field is then stored in the set data counter 4-2 as a set data number, whereby the macro key setting operation of the associated number is terminated.

When the check code of the manager level 1 is set in accordance with the aforementioned macro key data setting flowchart, the operation of the step 9-5 causes data 9101 to be written in the macro key setting field.

Figure 10:
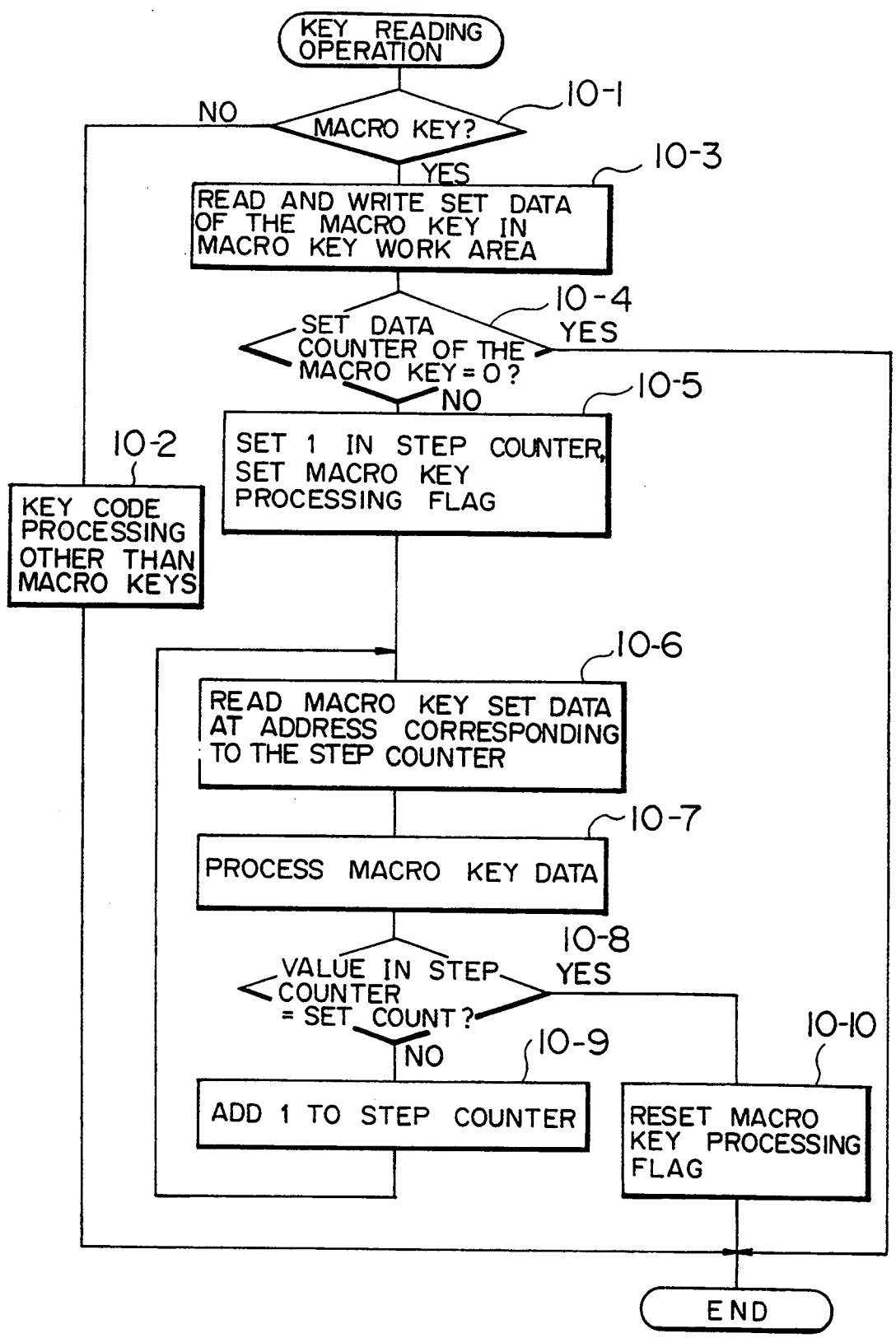
FIG. 10 is a flowchart for explaining key reading operation.

FIG. 10 shows a flowchart for explaining the reading operation of a key code from the keyboard 1-1. In more detail, when each key on the keyboard 1-1 is pushed, this causes a key code corresponding to the pushed key to be generated and then sent to the arithmetic operation controller 1-3. The arithmetic operation controller 1-3 first judges whether or not the key code is from a macro key (step 10-1). When determining that the key code is not from the macro key, the arithmetic operation controller executes its processing program corresponding to the key code as in the prior art (step 10-2). (This 'processing of branching to the associated processing program according to the key code' is referred to as the decoding operation of the key code.) When determining that the key code is from the macro key, the arithmetic operation controller performs the following operations (1) to (6).

(1) The controller reads out set data corresponding to the macro key from the macro key setting file 3-3 and writes it in the work areas 5-1 and 5-2 for use of internal arithmetic operation (step 10-3).

(2) The controller checks the set data counter 5-2 for the set data written on the work area (step 10-4). When the set data counter is 0, the controller terminates the reading operation of the macro key, since this means that macro set data is not set for the macro key.

(3) When the set data counter 5-2 is not 0 in the above Paragraph (2), the controller sets the step counter 5-3 at 1 and also sets the macro key processing flag 5-4 (step 10-5).

Figure 11:
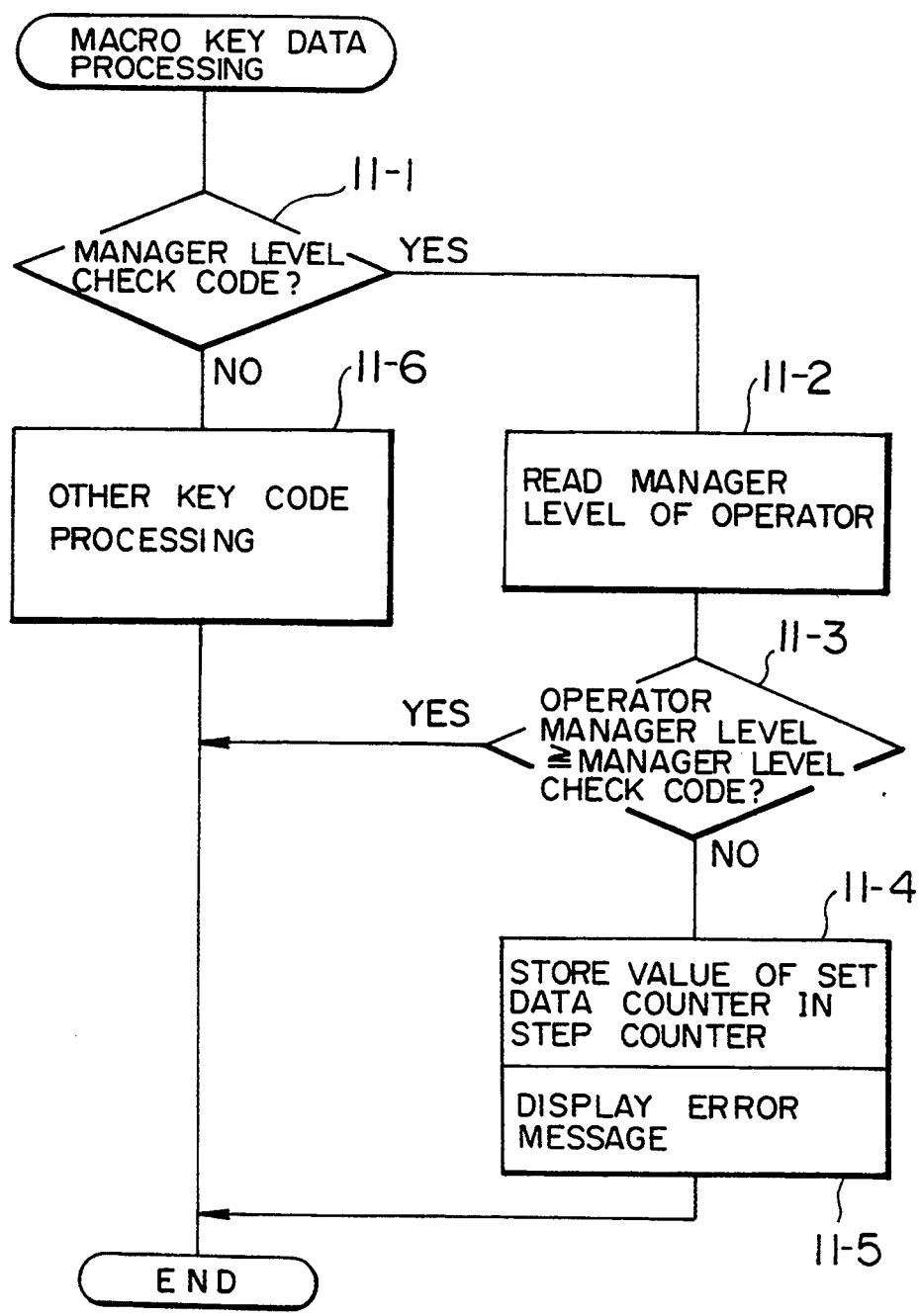
FIG. 11 is a flowchart for explaining the operation of the first embodiment in a macro-key setting data processing mode.

(4) The controller reads the macro key setting data 5-1 at the address corresponding to the step counter 5-3 (step 10-6) and executes the associated processing in accordance with a flowchart (explaining the macro key set data processing) shown in FIG. 11. After execution, the controller compares the value of the step counter 5-3 with that of the set data counter 5-2 (step 10-8). When the controller find a coincidence therebetween, control proceeds to a Paragraph (6) (to be explained later) to terminate the macro key reading operation, since the coincidence means the end of the final set data processing.

(5) When the controller fails to find the coincidence between the value of the step counter 5-3 and that of the set data counter 5-2 in the above Paragraph (4), the controller adds 1 to the step counter 5-3 (step 10-9) and goes again to the Paragraph (4).

(6) The controller resets the macro key processing flag 5-4 indicative of the macro key processing operation being activated (step 10-10) and terminates the reading operation of the associated macro key.

FIG. 11 shows a flowchart showing the macro key set data processing operation in FIG. 10 (step 10-7). As explained in the above Paragraph (4), the controller reads the macro key set data at the address corresponding to the step counter 5-3 and then judges whether or not the present data indicates the manager level check code (step 11-1). When determining that the data is not the manager level check code, the controller executes other key code processing (step 11-6). When determining that the data is the manager level check code, the controller reads the manager level of the operator in operation from the operator information setting file 3-3 and writes it in the work area 5-5 in association with the associated operator # already stored (step 11-2). The controller then compares the manager level of the operator in question with the manager level corresponding to the manager level check code of the associated macro key (step 11-3). When determining that the manager level of the operator in operation is higher than that of the manager level check code of the macro key in question, the controller terminates the manager level check code processing. When determining that the manager level of the operator in operation is smaller than that of the manager level check code of the macro key in question, the controller stores the value of the set data counter 5-2 in the step counter 5-3 (step 11-4), transfers an error message to the display unit 1-5 (step 11-5), and then terminates the macro key set data processing. In this connection, the storage of the value of the set data counter 5-2 in the step counter 5-3 is because, when the data of both counters are previously set to be equal to each other as explained in the above Paragraph (4) in connection with FIG. 10, the controller terminates the macro key reading operation at the time of occurrence of an error. When the data is not the manager level check code, the controller executes the associated processing program corresponding to the associated key code in the same manner as the non-macro-key code processing (step 10-2) in FIG. 10.

Figure 12:
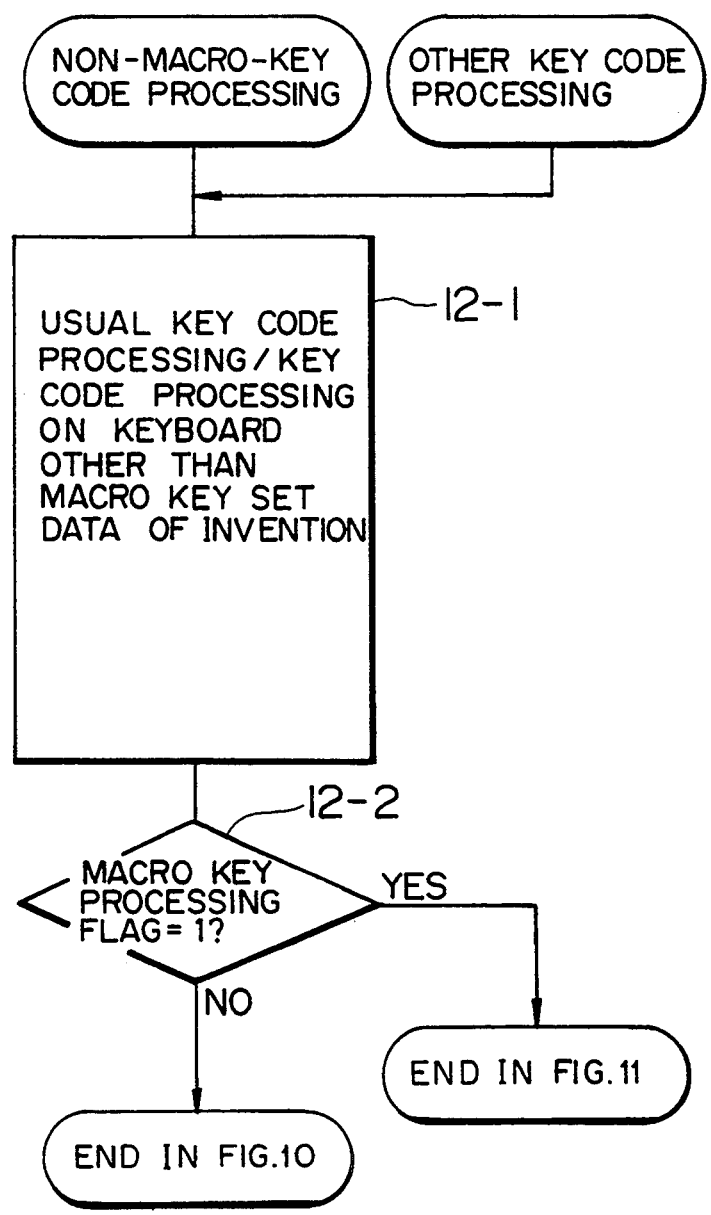
FIG. 12 is a flowchart for explaining the operation of a non-macro-key code processing mode.

FIG. 12 is a flowchart for explaining the operation of the non-macro-key code operation (step 10-2) in FIG. 10 and the other key code processing (step 11-6) in FIG. 11. In FIG. 12, the macro key processing flag 5-4 indicative of the macro key processing operation being activated is used to distinguish the non-macro-key code processing in FIG. 10 from the other key code processing in FIG. 11. The both processings have the same contents (key code processing (step 12-1)), but different in the branch destination after termination of the present processings. The other key code processing (step 11-6) in FIG. 11 is included in macro key processings, i.e., a part of the macro key set data processing. After executing the present processing, the controller goes again to the macro key set data processing and performs the macro key set data processing for the next address. To this end, the controller branches to a step END in FIG. 11. Meanwhile, the non-macro-key code processing (step 10-2) in FIG. 10 corresponds to the operation other than the macro key set data processing. After executing the present processing, the controller gets ready for an input from the keyboard 1-1. To this end, the controller branches to a step END in FIG. 10. The macro key processing flag 5-4 is used to judge the above branch (step 12-2).

It will be readily thought of from the foregoing embodiment that there may be considered the following methods (1) and (2).

(1) Although explanation has been made in connection with the case where the keying operation of the keyboard of the electronic register is used in order to set macro key information in the memory 1-4, a special setting keyboard may be employed or another electronic register or computer may be connected to the present electronic cash register for the same purpose.

(2) Although explanation has been made in connection with the case where the macro key information and the set data number of the associated macro key are set and the set data number is used to detect the final set data of the macro key reading operation in order to set macro key information in the macro key information file 3-3, an end code may be used as the macro key information set data or an invalid code may be written in the remaining space of the set area.

Embodiment 2

Figure 13:
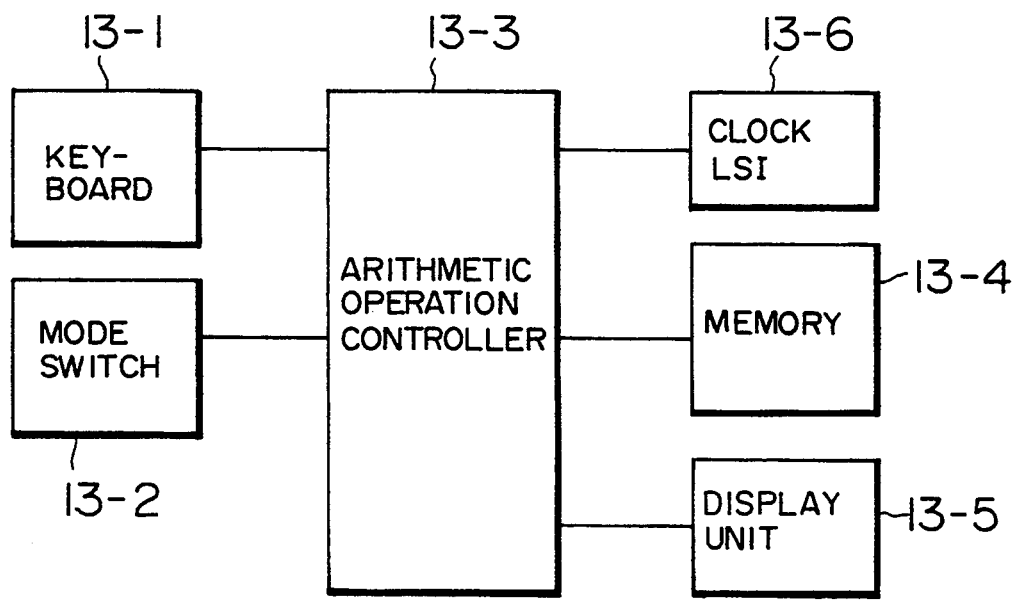
FIG. 13 is a block diagram of arrangements of second, third, fourth and eighth embodiments.

A second embodiment is shown in FIG. 13. The second embodiment includes, in addition to the constituent elements of the first embodiment of FIG. 1, a clock LSI 13-6 newly provided. With the present arrangement, an arithmetic operation controller 13-3 can read a time from the clock LSI 13-6.

FIG. 17 is a buffer for storing therein a key operating time within the work area. The buffer has fields of year (17-1), month (17-2), day of the month (17-3), day of the week (17-4) and hour/minute (17-5) at which the operator operates the electronic register.

Explanation will be made as to the operation of the second embodiment. In the present embodiment, a time range check code can be set as the macro key set data so that the operation of the associated macro key can be made valid only in an operation allowable time band corresponding to the time range check code of the macro key.

Shown in FIG. 18 is a structure of the time range check code set in a memory 13-4 of the electronic register as the macro key information. The data of the time range check code includes a function code (92) 18-1 indicative of the time range check code and a time range data 18-2. The time range check code is set in the memory 13-4 as the macro key information according to the flowchart of FIG. 9 in the same manner as in the first embodiment. For example, when it is desired to set a time range of from "9:30" to "10:00" as the macro key operation allowable time band, the operation of the step 9-5 causes data "9209301000" to be written in the macro key setting field 4-1.

Figure 24:
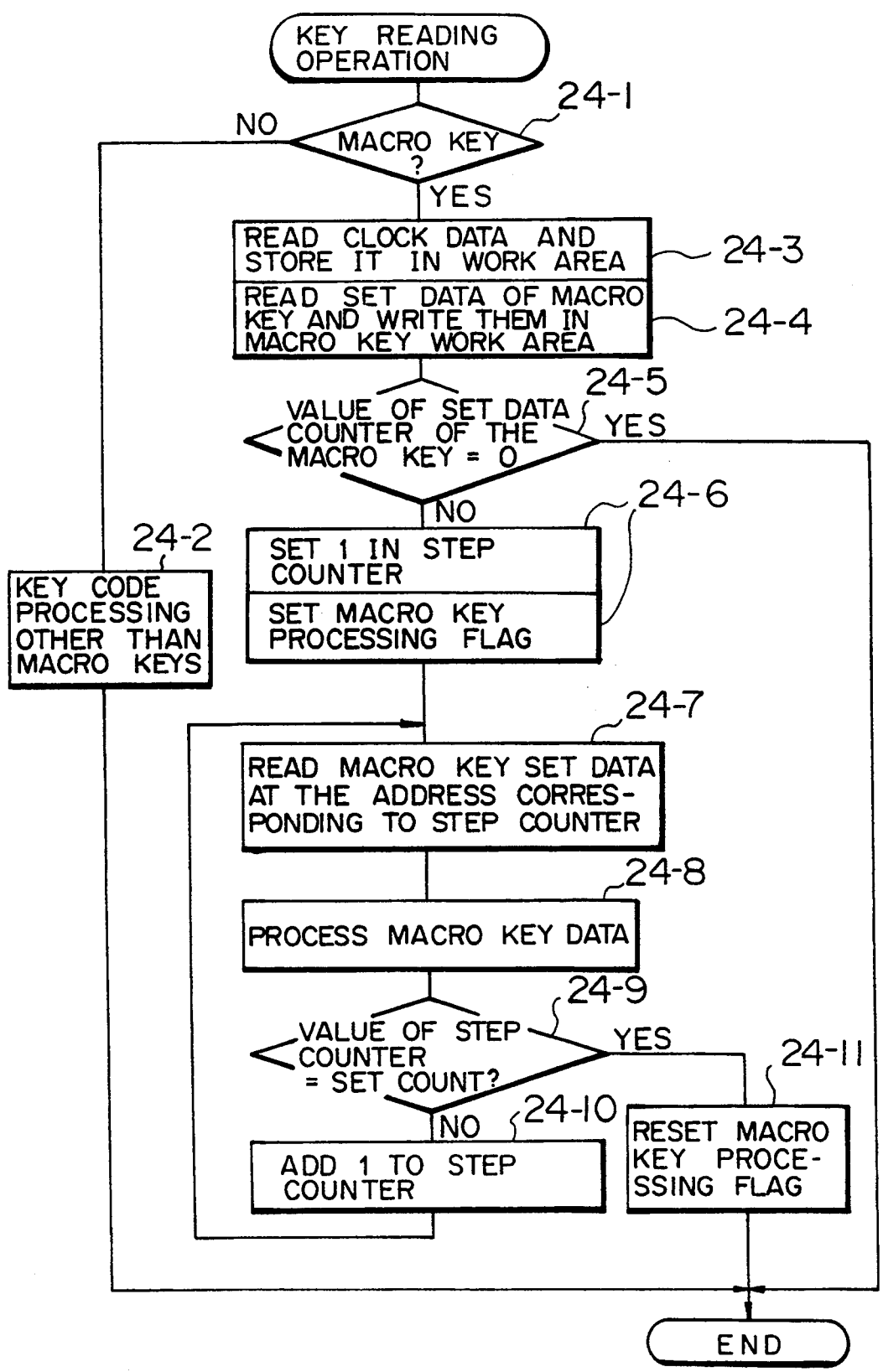
FIG. 24 is a flowchart for explaining the macro key setting operation of the second, third, fourth and eighth embodiments.

FIG. 24 is a flowchart for explaining the operation of reading a key code from the keyboard 13. More in detail, when each key is operated on the keyboard 13-1, this causes a key code corresponding to the operated key to be generated and sent to the arithmetic operation controller 13-3. The arithmetic operation controller 13-3 judges whether or not the associated key code is from a macro key (step 24-1). When determining that the key code is not from the macro key, the arithmetic operation controller executes the associated processing program corresponding to the key code as the code of the non-macro-key in the same manner as in the prior art (step 24-2). When the key code is from the macro key, the controller reads time data from the clock LSI 13-6 and stores it in the key operation time storage buffer (FIG. 17) in the work area (step 24-3). The controller performs the subsequent operations (1) to (6) as in the first embodiment 1.

(1) The controller reads set data corresponding to the associated macro key from the macro key setting file 3-3 and writes it in the work areas 5-1 and 5-2 for use of internal calculation (step 24-4).

(2) The controller checks the set data counter 5-2 for the set data written on the work areas (step 24-5). When determining that the counter is not 0, since this means the macro set data for the associated macro key is not set yet, the controller terminates the reading operation of the macro key in question.

(3) When the set data counter 5-2 is not 0 in the above Paragraph (2), the controller sets the step counter 5-3 at 1 and also sets the macro key processing flag 5-4 indicative of the macro key processing being activated (step 24-6).

Figure 25:
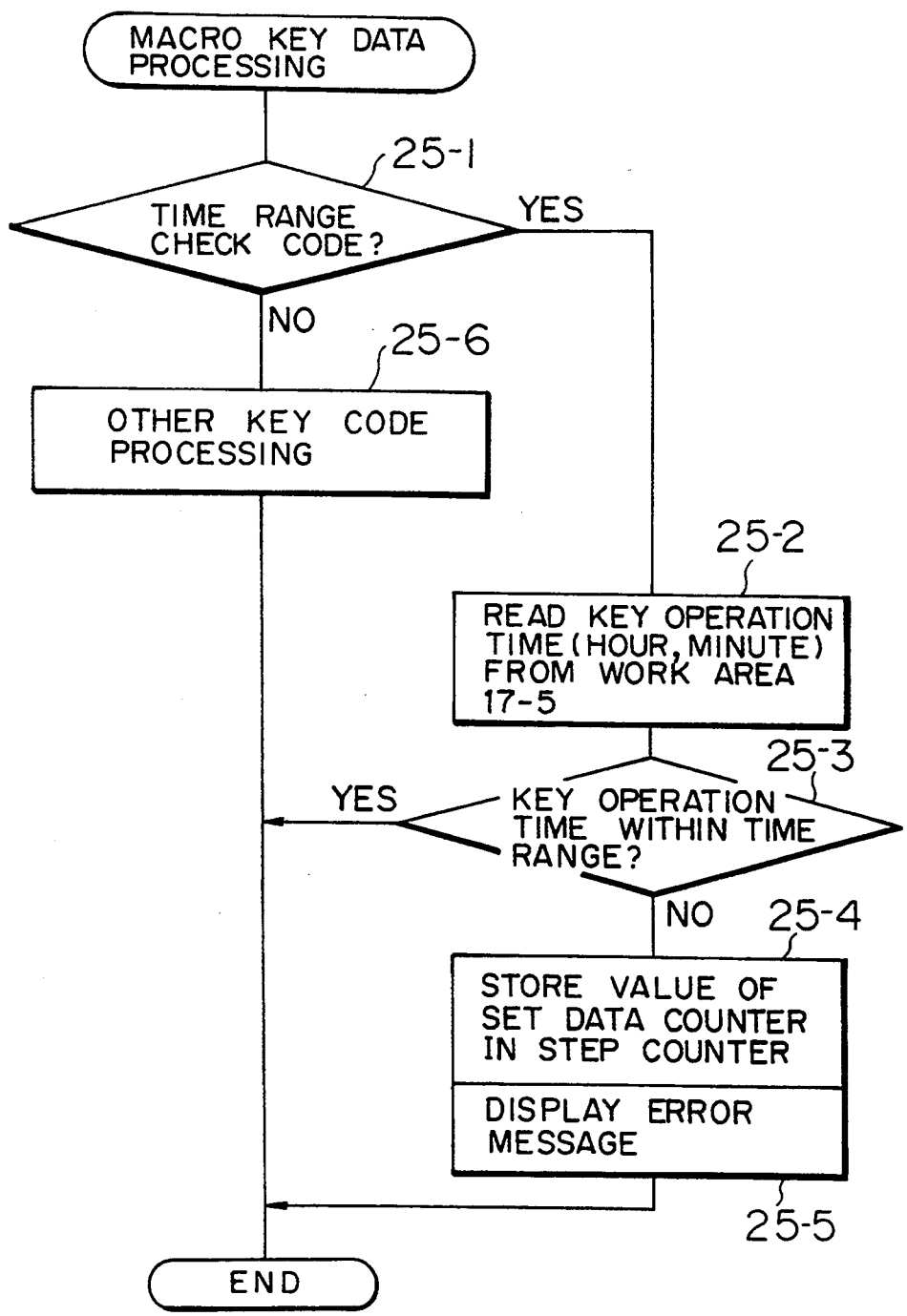
FIG. 25 is a flowchart for explaining the macro key setting data processing operation of the second embodiment.

(4) The controller reads the macro key set data 5-1 at the address corresponding to the step counter 5-3 (step 24-7) and executes the associated processing in the same manner as the macro key set data processing of FIG. 25 (step 24-8). After the above execution, the controller compares the value of the step counter 5-3 with that of the set data counter 5-2 (step 24-9). When finding a coincidence therebetween, which indicates the end of the final set data, the controller goes to a Paragraph (6) (to be explained later) to terminate the operation of reading the macro key in question.

(5) When the controller fails to find the coincidence between the value of the step counter 5-3 and that of the set data counter in the above Paragraph (4), the controller adds 1 to the step counter 5-3 (step 24-10) and goes again to the above Paragraph (4).

(6) The controller resets the macro key processing flag 5-4 indicative of the macro key processing being activated (step 24-11) and terminates the macro key reading operation in question.

FIG. 25 shows a flowchart for explaining the macro key set data processing (step 24-8) in FIG. 24. As already explained in the above Paragraph (4), the controller reads the macro key set data at the address corresponding to the step counter 5-3, and then judges whether or not the set data indicates the time range check code (step 25-1). When the present data is not the time range check code, the controller executes the other-key code processing (step 25-6). When the present data is the time range check code, the controller reads the operation time data 17-5 from the key operation time storage buffer (FIG. 17) in the work area (step 25-2) and then compares the operation time data 17-5 of the macro key in question with the operation allowable time band corresponding to the time range check code of the macro key (step 25-3). When the macro key operation time is within the operation allowable time band corresponding to the time range check code of the associated macro key, the controller terminates the time range check code processing. When the macro key operation time is out of the operation allowable time band corresponding to the time range check code of the associated macro key, the controller stores the value of the set data counter 5-2 in the step counter 5-3 (step 25-4), transfers an error message to the display 13-5 (step 25-5), and then terminates the macro key set data processing.

The second embodiment is also operated substantially in the same manner as FIG. 12.

Embodiment 3

The third embodiment has substantially the same arrangement as the second embodiment of FIG. 13.

Explanation will be made as to the operation of the third embodiment. In the third embodiment, a date check code can be set as the set data of a macro key and the operation of the macro key in question can be made valid only on the operation allowable day corresponding to the date check code of the macro key.

Shown in FIG. 19 is a structure of the date check code set in a memory 13-4 of the electronic register as the macro key information. The data of the date check code includes a function code (93) 19-1 indicative of the date check code and date data 19-2. The date check code is set in the memory 13-4 as the macro key information according to the flowchart of FIG. 9 in the same manner as in the first embodiment. For example, when it is desired to set one day as the operation allowable day of the macro key, the operation of the step 9-5 causes data "9301" to be written in the macro key setting field 4-1.

The key code reading operation from the keyboard 13-1 is carried out in accordance with the flowchart of FIG. 24 as in the second embodiment.

Figure 26:
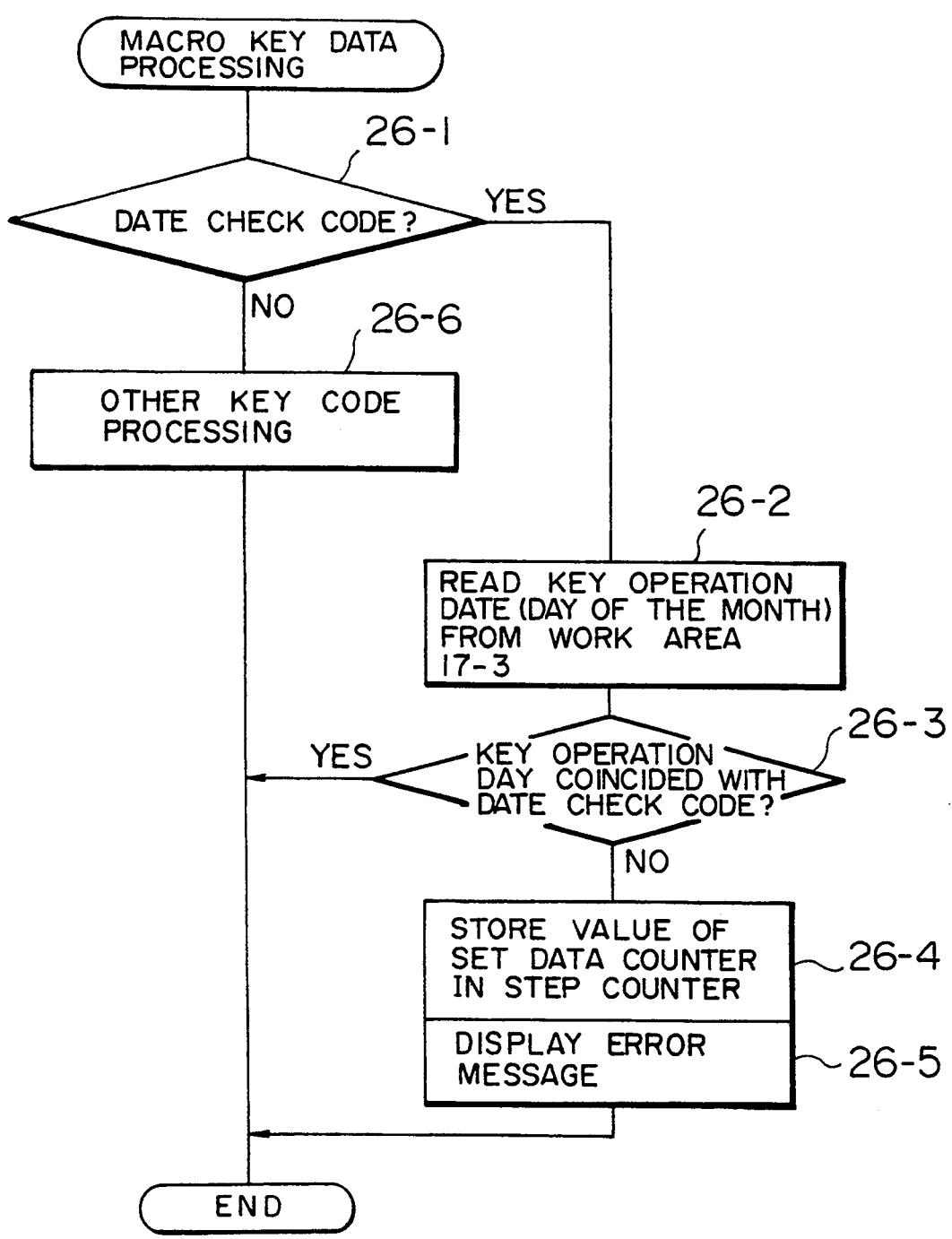
FIG. 26 is a flowchart for explaining the macro key setting data processing operation of the third embodiment.

FIG. 26 shows a flowchart for explaining the macro key set data processing (step 24-8) in FIG. 24. As already explained in the above Paragraph (4), the controller reads the macro key set data at the address corresponding to the step counter 5-3, and then judges whether or not the set data indicates the date check code (step 26-1). When the present data is not the date check code, the controller executes the other-key code processing (step 26-6). When the present data is the date check code, the controller reads the operation time data 17-3 from the key operation time storage buffer (FIG. 17) in the work area (step 26-2). Then, the controller compares the operation time data 17-3 of the macro key in question with the operation allowable day corresponding to the date check code of the macro key (step 26-3). When the macro key operation day coincides with the operation allowable day corresponding to the date check code of the associated macro key, the controller terminates the date check code processing. When the macro key operation day does not coincide with the operation allowable day corresponding to the date check code of the associated macro key, the controller stores the value of the set data counter 5-2 in the step counter 5-3 (step 26-4), transfers an error message to the display 13-5 (step 26-5), and then terminates the macro key set data processing.

The third embodiment is also operated substantially in accordance with the flowchart of FIG. 12.

Embodiment 4

The fourth embodiment has substantially the same structure shown in FIG. 13 as the second and third embodiments.

Explanation will be made as to the operation of the fourth embodiment. In the fourth embodiment, a day of the week check code can be set as the set data of a macro key and the operation of the macro key in question can be made valid only on the operation allowable day of the week corresponding to the day of the week check code of the macro key.

Shown in FIG. 20 is a structure of the day of the week check code set in a memory 13-4 of the electronic register as the macro key information. The data of the day of the week check code includes a function code (94) 20-1 indicative of the day of the week check code and day of the week data 20-2. The day of the week check code is set in the memory 13-4 as the macro key information according to the flowchart of FIG. 9 in the same manner as in the first embodiment. For example, when it is desired to set monday as the operation allowable day of the week of the macro key, the operation of the step 9-5 causes data "9401" to be written in the macro key setting field 4-1.

The key code reading operation from the keyboard 13-1 is carried out in accordance with the flowchart of FIG. 24 as in the second embodiment.

Figure 27:
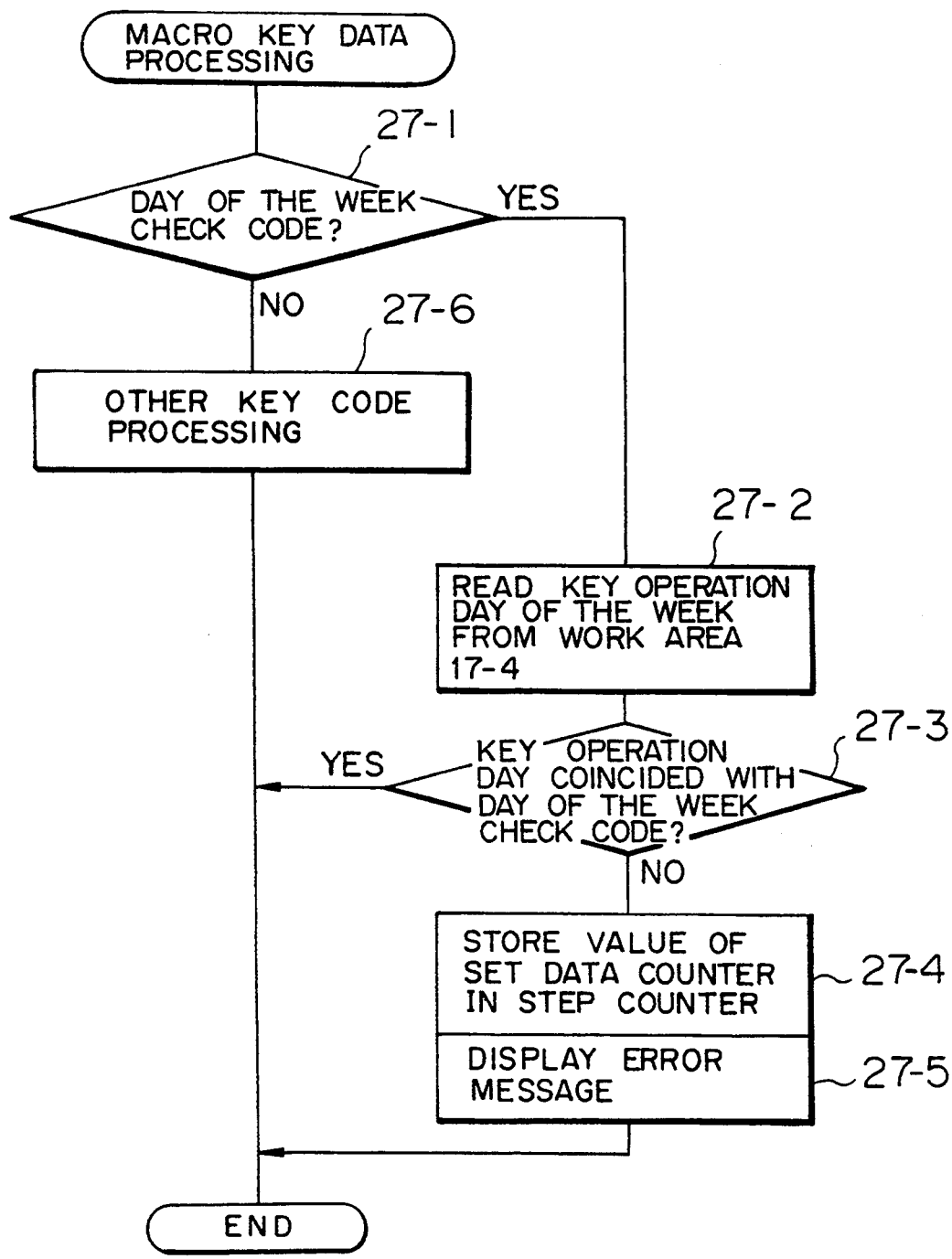
FIG. 27 is a flowchart for explaining the macro key setting data processing operation of the fourth embodiment.

FIG. 27 shows a flowchart for explaining the macro key set data processing (step 24-8) in FIG. 24. The controller reads the macro key set data at the address corresponding to the step counter 5-3, and then judges whether or not the set data indicates the day of the week check code (step 27-1). When the present data is not the day of the week check code, the controller executes the other key code processing (step 27-6). When the present data is the day of the week check code, the controller reads the operation day of the week data 17-4 from the key operation time storage buffer (FIG. 17) in the work area (step 27-2). Then, the controller compares the operation day of the week data 17-4 of the macro key in question with the operation allowable day of the week corresponding to the day of the week check code of the macro key (step 27-3). When the macro key operation day of the week coincides with the operation allowable day of the week corresponding to the day of the week check code of the associated macro key, the controller terminates the day of the week check code processing. When the macro key operation day of the week does not coincide with the operation allowable day of the week corresponding to the day of the week check code of the associated macro key, the controller stores the value of the set data counter 5-2 in the step counter 5-3 (step 27-4), transfers an error message to the display 13-5 (step 27-5), and then terminates the macro key set data processing.

The fourth embodiment is also operated substantially in accordance with the flowchart of FIG. 12.

Embodiment 5

Figure 14:
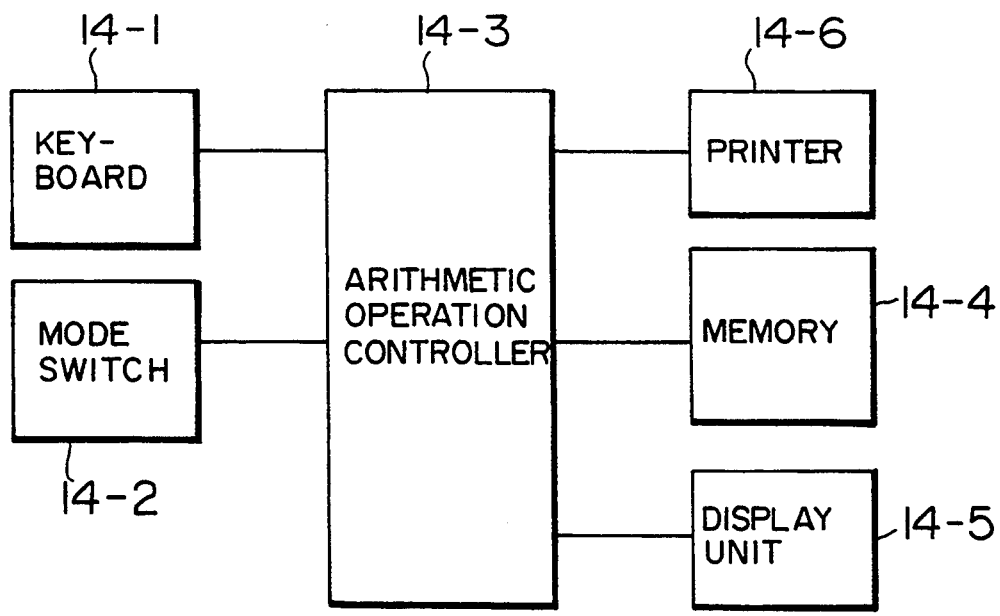
FIG. 14 is a block diagram of an arrangement of a fifth embodiment.

FIG. 14 shows a block diagram of a fifth embodiment. In the fifth embodiment, a printer 14-6 is newly added, in addition to the constituent elements of the first embodiment. With the present arrangement, when an arithmetic operation controller 14-3 sends to the printer 14-6 such an operational mode command as receipt stop or journal stop to specify the print mode. The printer 14-6, when receiving the operational mode command from the arithmetic operation controller 14-3, sequentially prints registered data in the specified print mode.

Explanation will be made as to the operation of the fifth embodiment. In the fifth embodiment, a print mode assignment code can be set as the set data of a macro key and when the print mode is arbitrarily assigned to the printer at the time of operating the macro key in question, the registered data can be printed.

Shown in FIG. 21 is a structure of the print mode assignment code set in a memory 14-4 of the electronic register as the macro key information. The data of the print mode assignment code includes a function code (95) 21-1 indicative of the print mode assignment code and print mode assignment data 21-2. The print mode assignment code is set in the memory 14-4 as the macro key information according to the flowchart of FIG. 9 in the same manner as in the first embodiment. For example, when it is desired to set a receipt stop mode as the print mode assignment code of the macro key, the operation of the step 9-5 causes data "9501" to be written in the macro key setting field 4-1.

The key code reading operation from the keyboard 14-1 is carried out in accordance with the flowchart of FIG. 10 as in the first embodiment.

Figure 28:
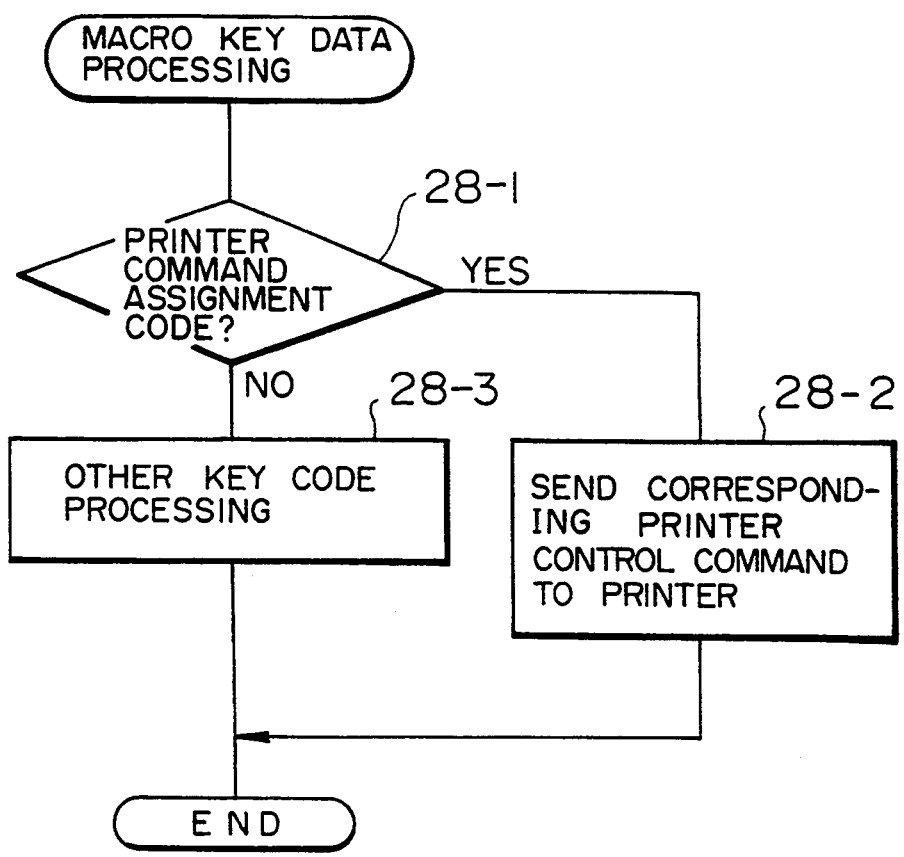
FIG. 28 is a flowchart for explaining the macro key setting data processing operation of the fifth embodiment.

FIG. 28 shows a flowchart for explaining the macro key set data processing (step 10-7) in FIG. 10. The controller reads the macro key set data at the address corresponding to the step counter 5-3, and then judges whether or not the set data indicates the print mode assignment code (step 28-1). When the present data is not the print mode assignment code, the controller executes the other-key code processing (step 28-3). When the present data is the print mode assignment code, the controller sends the corresponding print control command to the printer 14-6 (step 28-2) and terminates the print mode assignment code processing.

The fifth embodiment is also operated substantially in accordance with the flowchart of FIG. 12.

Embodiment 6

Figure 15:
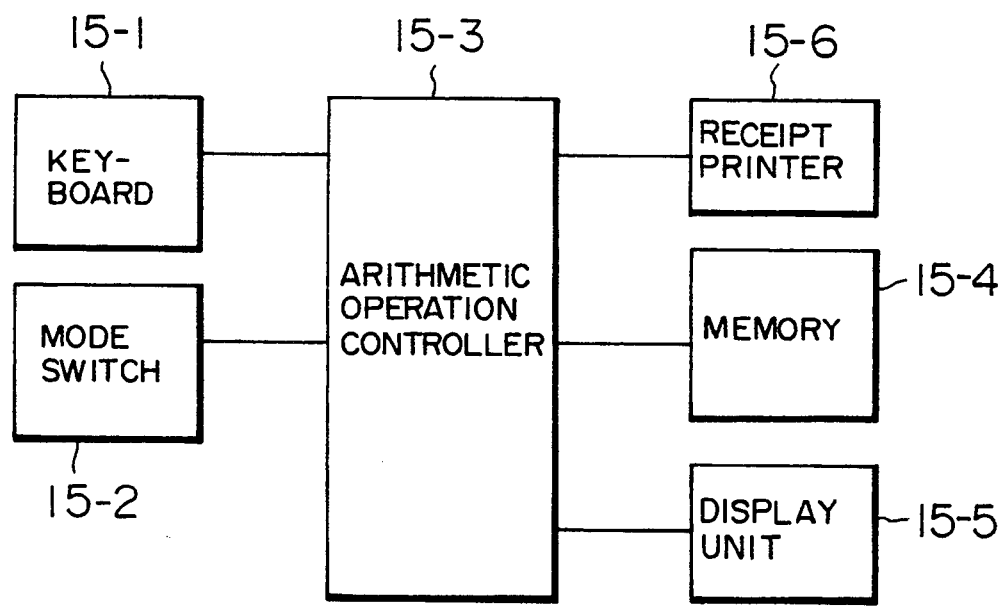
FIG. 15 is a block diagram of an arrangement of a sixth embodiment.

FIG. 15 shows a block diagram of a sixth embodiment. In the sixth embodiment, a receipt printer 15-6 for issuing a legal receipt is newly provided, in addition to the constituent elements of the first embodiment of FIG. 1. With the present arrangement, when an arithmetic operation controller 15-2 inquires of the receipt printer 15-6 about its ready state for the receipt print. When a receipt sheet is set in the printer, the arithmetic operation controller can sequentially send registered data to the receipt printer 15-6 to print the receipt.

Figure 31:
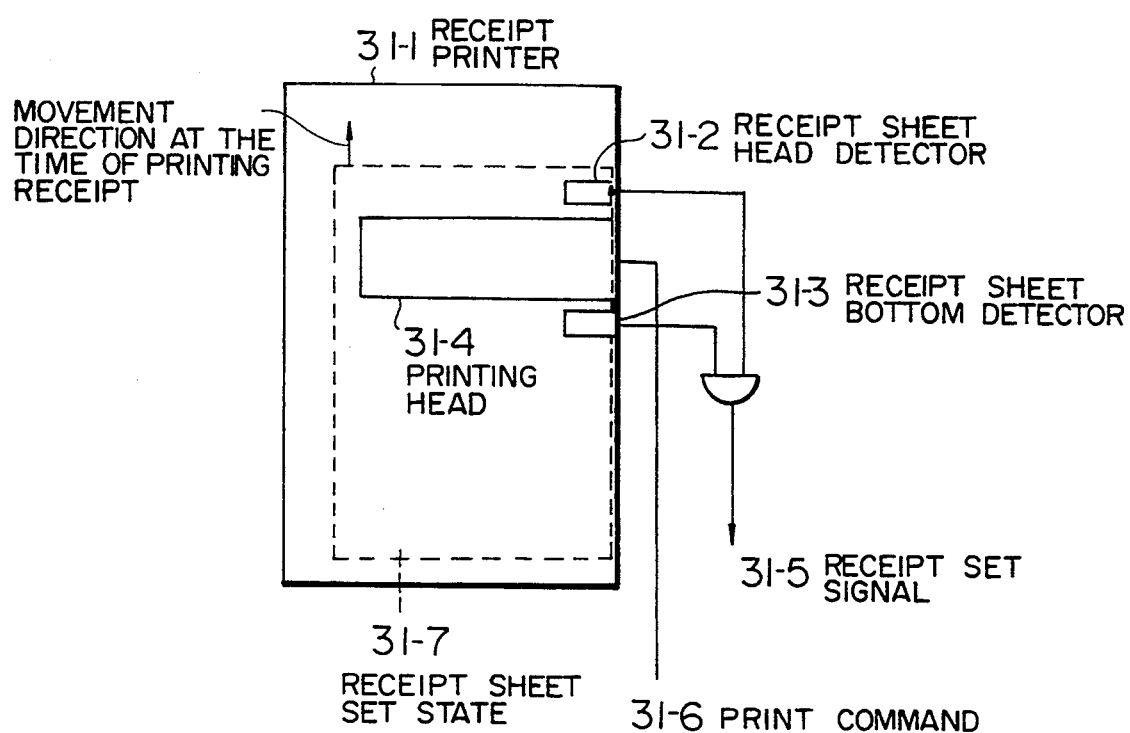
FIG. 31 is a structure of a receipt printer.
Figures 32, 33:
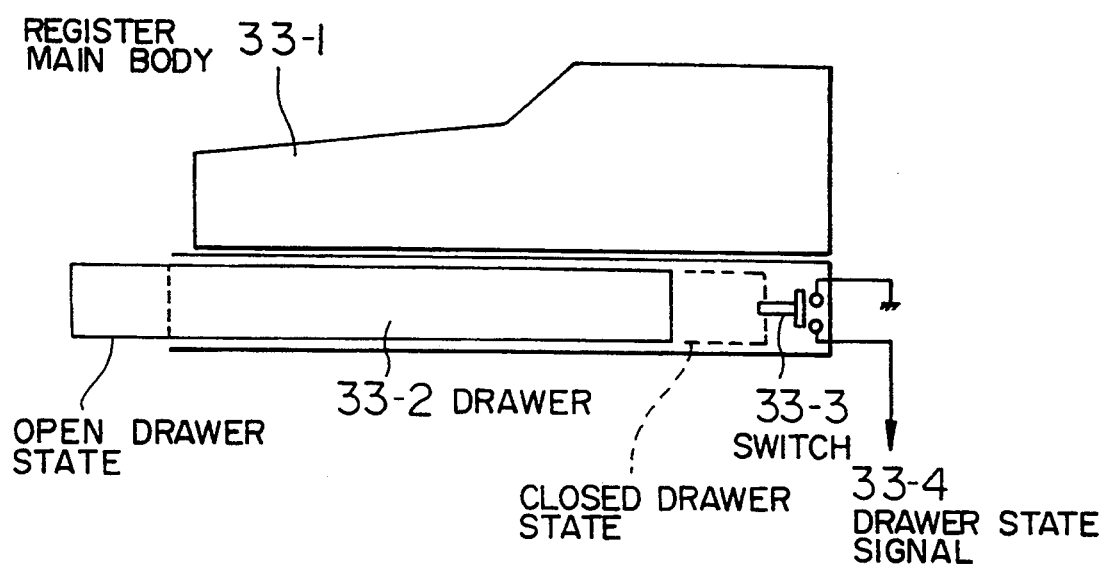
FIG. 32 is an example of a printed receipt.
FIG. 33 is a structure of a drawer.

FIG. 31 shows a structure of the receipt printer 15-6. A receipt is set in such a state as shown by a reference symbol 31-7 in FIG. 31. A receipt set signal 31-5 is output from the receipt printer as a logical "OR" operation on an output of a receipt printer header detector 31-2 and an output of a printer receipt trailer detector 31-3. A print command 31-6 is sequentially sent to a print head 31-4 to print such a receipt as shown in FIG. 32.

Explanation will be made as to the operation of the fifth embodiment. In the fifth embodiment, a receipt check code can be set as the set data of a macro key and only when a receipt sheet used as tax payment materials is set in the receipt printer, the operation of the associated macro key can be made valid, in which case the registered data is sequentially printed out from the receipt printer.

Shown in FIG. 22 is a structure of the receipt check code set in a memory 15-4 of the electronic register as the macro key information. The data of the receipt check code includes a function code (96) 22-1 indicative of the receipt check code and a receipt check code 22-2. The receipt check code is set in the memory 15-4 as the macro key information according to the flowchart of FIG. 9 in the same manner as in the first embodiment. When it is desired to set the receipt check code in the present embodiment, the operation of the step 9-5 causes data "9601" to be written in the macro key setting field 4-1.

The key code reading operation from the keyboard 15-1 is carried out in accordance with the flowchart of FIG. 10 as in the first embodiment.

Figure 29:
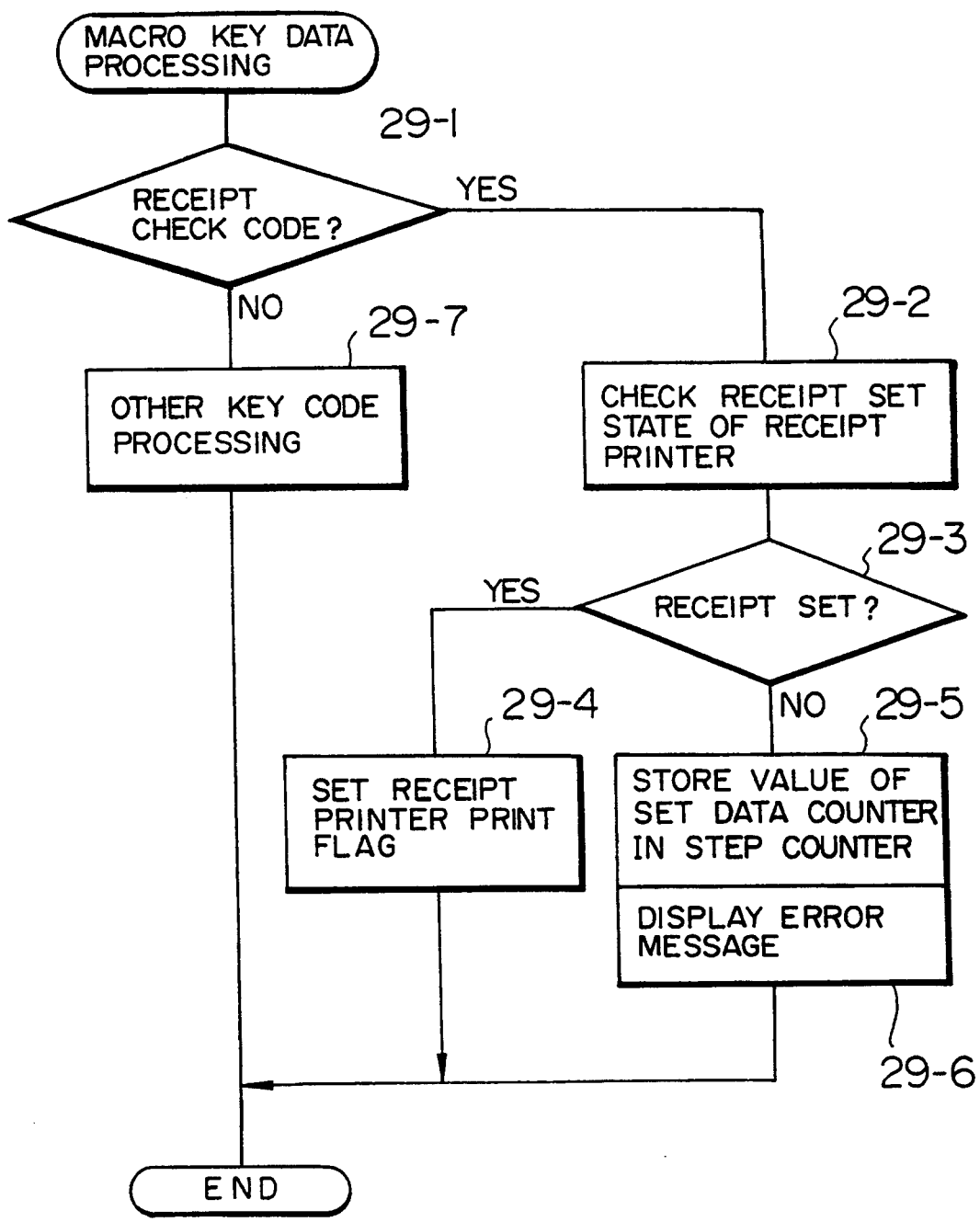
FIG. 29 is a flowchart for explaining the macro key setting data processing operation of the sixth embodiment.

FIG. 29 shows a flowchart for explaining the macro key set data processing (step 10-7) in FIG. 10. The controller reads the macro key set data at the address corresponding to the step counter 5-3, and then judges whether or not the set data indicates the receipt check code (step 29-1). When the present data is not the receipt check code, the controller executes the other-key code processing (step 29-7). When the present data is the receipt check code, the controller sends a receipt check command to the receipt printer 15-6 and reads the receipt set state of the printer (step 29-2). The controller next checks the set or non-set state of the present receipt (step 29-3). When the receipt is set in the printer, the controller sets the receipt printer print flag 5-6 of the work area (step 29-4) and terminates the receipt check code processing. When the receipt is not set, the controller stores the value of the set data counter 5-2 in the step counter 5-3 (step 29-5), transfers an error message to a display unit 15-5 (step 29-6), and then terminates the macro key set data processing. When the receipt printer print flag 5-6 is set, the controller sequentially sends the corresponding data to the receipt printer 15-6 for each registered data to print out the associated receipt.

The sixth embodiment is also operated substantially in accordance with the flowchart of FIG. 12.

Embodiment 7

Figure 16:
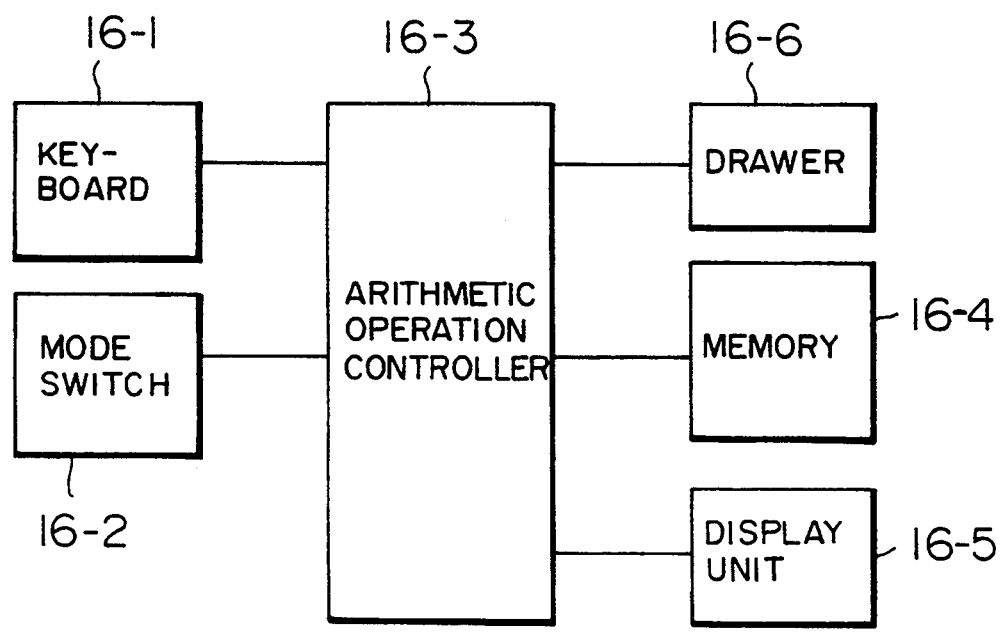
FIG. 16 is a block diagram of an arrangement of a seventh embodiment.

FIG. 16 shows a block diagram of a seventh embodiment. In the seventh embodiment, a drawer 16-6 is newly added, in addition to the constituent elements of the first embodiment. With the present arrangement, an arithmetic operation controller 16-3 can operate the drawer as well as recognize the open or closed state of the drawer 16-6.

FIG. 33 shows a structure of the drawer 16-6. The open or closed state of a drawer 33-2 is detected by a switch 33-3 and output as a drawer state signal 33-4.

Explanation will be made as to the operation of the seventh embodiment. In the seventh embodiment, a drawer state check code can be set as the set data of a macro key and when the drawer state check code is present, the controller checks the open or closed state of the drawer at the time of operating the associated macro key. Only when the controller detects the closed state of the drawer, the controller made valid the corresponding macro key processing.

Shown in FIG. 23 is a structure of the drawer state check code set in a memory 16-4 of the electronic register as the macro key information. The data of the drawer state check code includes a function code (97) 23-1 indicative of the drawer state check code and a drawer state check code 23-2. The drawer state check code is set in the memory 16-4 as the macro key information according to the flowchart of FIG. 9 in the same manner as in the first embodiment. When it is desired to set the drawer state check code, the operation of the step 9-5 causes data "9701" to be written in the macro key setting field 4-1.

The key code reading operation from the keyboard 15-1 is carried out as in the first embodiment (FIG. 10).

Figure 30:
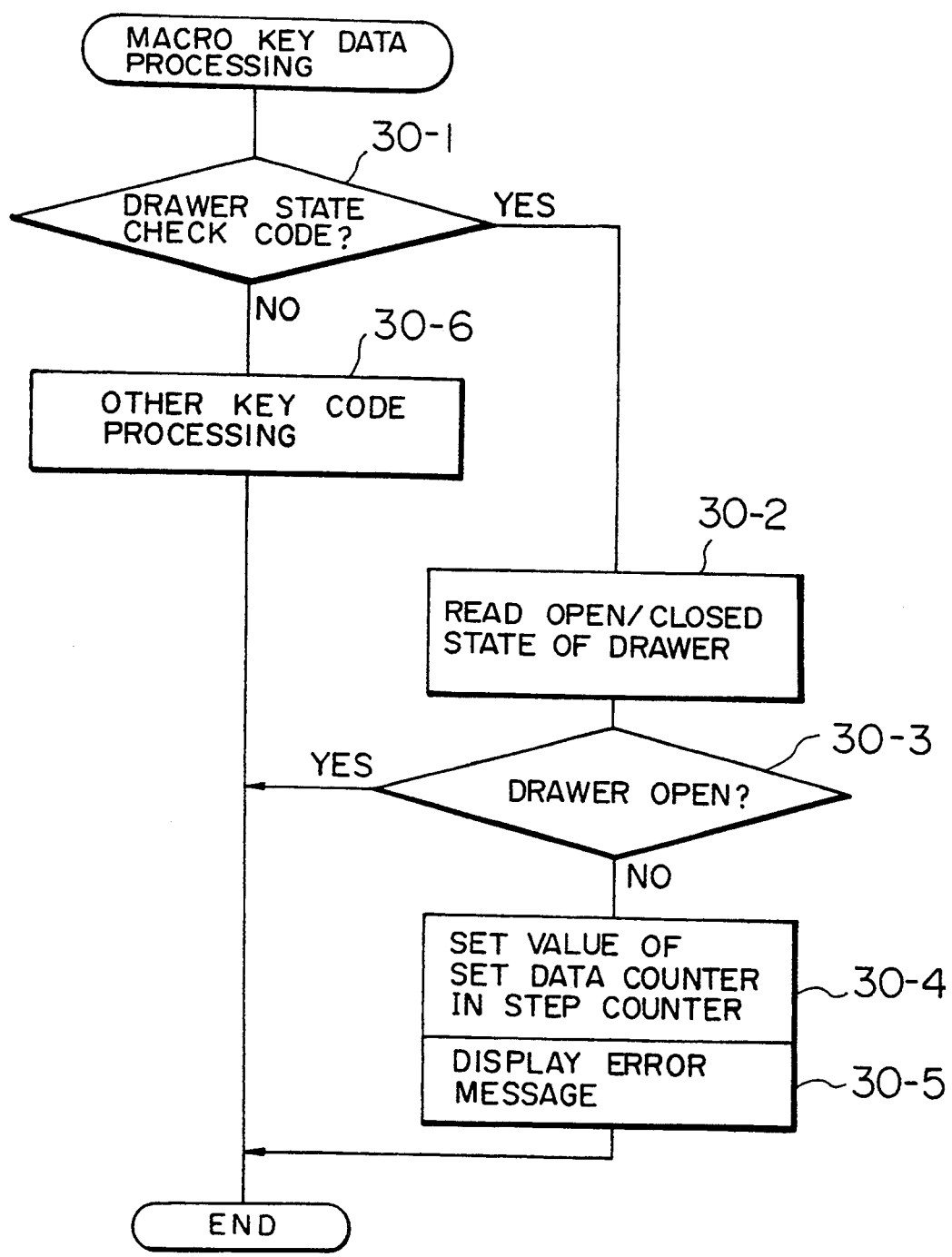
FIG. 30 is a flowchart for explaining the macro key setting data processing operation of the seventh embodiment.

FIG. 30 shows a flowchart for explaining the macro key set data processing (step 10-7) in FIG. 10. The controller reads the macro key set data at the address corresponding to the step counter 5-3, and then judges whether or not the set data indicates the drawer state check code (step 30-1). When the present data is not the drawer state check code, the controller executes the other-key code processing (step 30-6). When the present data is the drawer state check code, the controller reads the open or closed state of the drawer 16-6 (step 30-2). Then, the controller judges the open or closed state of the drawer (step 30-3). When determining the closed state, the controller terminates the drawer state check code processing. When the drawer is in the open state, the controller the value of the set data counter 5-2 in the step counter 16-5 (step 30-4), transfers an error message to a display unit 16-5 (step 30-5), and then terminates the macro key set data processing.

The seventh embodiment is also operated substantially in accordance with the flowchart of FIG. 12.

Embodiment 8

The eighth embodiment has substantially the same structure shown in FIG. 13 as the second, third and fourth embodiments.

Explanation will be made as to the operation of the eighth embodiment. In the eighth embodiment, a day of the week check code can be set as the set data of a macro key and the operation of the macro key in question can be made valid only when the operation day of the week of the associated macro key coincides with any one of a plurality of days of the week set as the day of the week check code.

Shown in FIG. 20 is a structure of the day of the week check code set in a memory 13-4 of the electronic register as the macro key information. The data of the day of the week check code includes a function code (94) 20-1 indicative of the day of the week check code and day of the week data 20-2. The day of the week check code is set in the memory 13-4 as the macro key information according to the flowchart of FIG. 9 in the same manner as in the first embodiment. For example, when it is desired to set monday as the operation allowable day of the week of the macro key, the operation of the step 9-5 causes data "9401" to be written in the macro key setting field 4-1.

Figure 35:
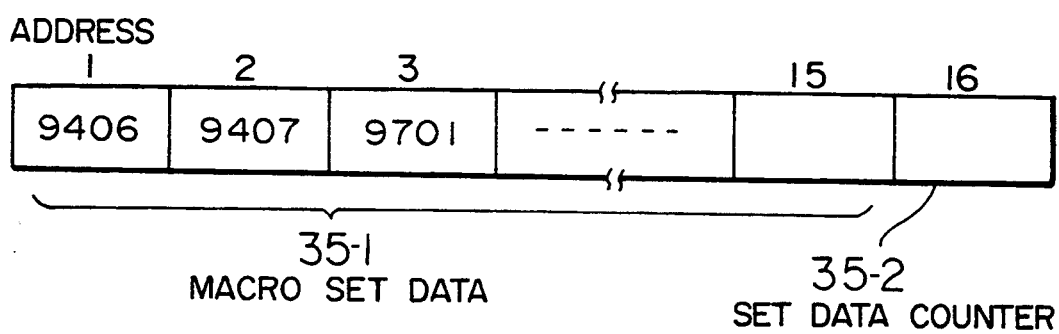
FIG. 35 is an example of the macro key setting data in the eighth embodiment.
Figure 36:
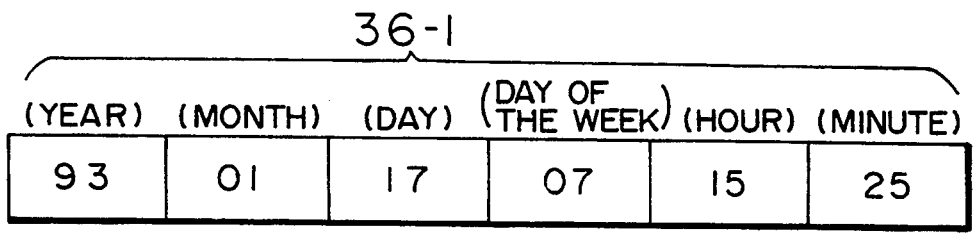
FIG. 36 is a buffer for storing therein a macro key operation date.

FIG. 35 shows an example of a plurality of days of the week (9406: Saturday, 9407: Sunday) set as the macro key information in the memory 13-4 of the electronic register. Assuming that the macro key in question is operated to be 15: 25 on January 17 (Sunday), 1993, then the key operation time storage buffer of the work area (FIG. 17) becomes as shown by reference symbol 36-1 in FIG. 36.

The present embodiment is operated substantially in accordance with the flowchart of FIG. 24 of reading operation of a key code from the keyboard 13-1 as in the second embodiment.

Figure 34:
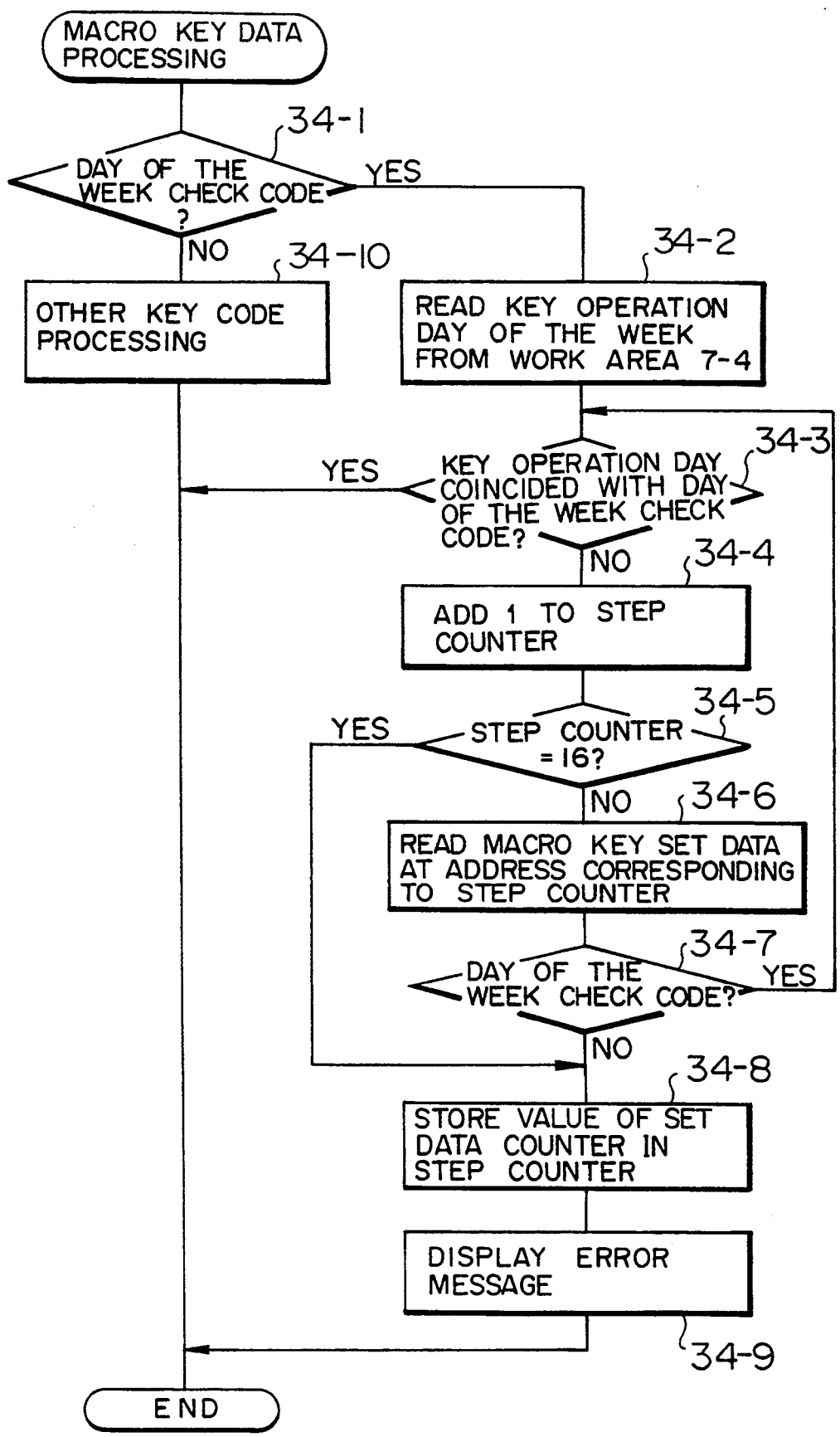
FIG. 34 is a flowchart for explaining the macro key setting data processing operation of the eighth embodiment.

FIG. 34 shows a flowchart for explaining the macro key set data processing (step 24-8) in FIG. 24. The controller reads the macro key set data at the address corresponding to the step counter 5-3, and then judges whether or not the set data indicates the day of the week check code (step 34-1). When the present data is not the day of the week check code, the controller executes the other key code processing (step 34-10). When the present data is the day of the week check code, the controller reads the operation day of the week data 17-4 from the key operation time storage buffer (FIG. 17) in the work area (step 34-2). Then, the controller compares the operation day of the week data 17-4 of the macro key in question with the operation allowable day of the week corresponding to the day of the week check code of the macro key (step 34-3). When the macro key operation day of the week coincides with the operation allowable day of the week corresponding to the day of the week check code of the associated macro key, the controller terminates the day of the week check code processing. When the macro key operation day of the week does not coincide with the operation allowable day of the week corresponding to the day of the week check code of the associated macro key, the controller adds 1 to the step counter 5-3 (step 34-4). The controller checks whether or not the value of the step counter 5-3 is equal to 16 (step 34-5). When the value of the step counter is less than 16, the controller reads the macro key set data at the corresponding address (step 34-6), and then judges whether or not the present data indicates the day of the week check code (step 34-7). When the present data indicates the day of the week check code, the controller returns to the step 34-3 to compare the macro key operation day of the week data 17-4 with the operation allowable day of the week corresponding to the day of the week check code of the macro key in question. When the present data is not the day of the week check code, the controller stores the value of the set data counter 5-2 in the step counter 5-3 (step 34-8), transfers an error message to the display 13-5 (step 34-9), and then terminates the macro key set data processing. When it is determined in the step 34-5 that the value of the step counter 5-3 is 16, which means that the macro key set data is terminated, control goes to the step 34-8.

Through the above operation, a plurality of days of the week (9406: Saturday, 9407; Sunday) are set as the macro key information so that, when the macro key is operated, for example, at 15: 25 on January 17 (Sunday), 1993, the data 9406 (indicating that the macro key is set at Saturday) is judged as not coincided in the first day of the week checking operation (step 34-3) but is judged as coincided in the next day of the week check (step 34-3), in which case the operation of the macro key becomes valid.

The eighth embodiment is also operated in accordance with the flowchart of FIG. 12.

In the foregoing, explanation has been made in the case where, as a typical example, check codes are set for the plurality of days of the week so that, when the operation day of the week of the macro key in question coincides with any one of the set days of the week, the operation of the macro key is made valid. However, a plurality of check codes may be set for date or the like so that the operation date coincides with any of the set dates, the operation of the macro key can be made valid through the similar processing.

In accordance with the present invention, functions settable for macro keys can include, in addition to the functions of macro keys of the keyboard of the electronic register having key codes marked thereon, the following functions (1) to (8) based on any combinations of such manager level check code, day of the week check code, print mode assignment code, receipt check code and drawer state check code as explained above.

(1) When a macro key is operated, the manager level of an operator being operating the electronic register is checked so that, only when the manager level of the operator in operation is equal to or higher than a specific manager level, the operation of the macro key in question is made valid.

(2) When a macro key is operated, the operation time of the macro key is checked so that, only when the checked operation time is within a specific time band, the operation of the macro key in question is made valid.

(3) When a macro key is operated, the operation day of the macro key is checked so that, only when the checked operation day corresponds to a specific day, the operation of the macro key in question is made valid.

(4) When a macro key is operated, the operation day of the week of the macro key is checked so that, only when the checked operation day of the week corresponds to a specific day of the week, the operation of the macro key in question is made valid.

(5) When a macro key is operated, a print mode of the printer is checked so that, only when the checked mode coincides with a specific print mode, the operation of the macro key is made valid.

(6) When a macro key is operated, a receipt ready state of the receipt printer is checked so that, only when a receipt is set in the printer, the operation of the macro key in question is made valid. That is, when a specific macro key is operated, the receipt is forcibly printed out.

(7) When a macro key is operated, the open or closed state of the drawer is checked so that, only when the drawer is in the closed state, the operation of the macro key in question is made valid. That is, this function can prompt the operator to carefully manage the drawer, which is important from the viewpoint of safety.

(8) When a macro key is operated, the operation day of the week or date of the macro key is checked so that, when the checked day of the week or date coincides with any one of a plurality of specific days of the week or dates, the operation of the macro key is made valid.

What is claimed is:

1. An electronic cash register comprising a keyboard having macro keys and usual keys for generating a key code when one of said keys is operated, an arithmetic operation controller, a memory and display means, said arithmetic operation controller comprising:

first setting means for setting in said memory sequences of key codes corresponding to said usual keys as well as a manager level check code which requires a manager level of an operator being operating said register to be checked, as macro key set data corresponding to said macro keys;

second setting means for setting in said memory respective identification codes IDs determined by predetermined operators who are to operate said register and respective manager levels of said operators;

registration means for being able to register an ID of an operator wishing to operate the register prior to operation of the macro key;

comparison means for comparing the manager level of the operator being handling the register with the manager level specified by the manager level check code corresponding to the associated macro key;

a key code decoder for sequentially decoding the sequence of the key code; and processing means for ignoring the sequence of the key code, displaying an error on said display means and terminating processing of the associated macro key, wherein, when one of the macro keys of said keyboard is operated and when said comparison means judges that the manager level of the operator in operation is higher than the manager level specified by the manager level check code corresponding to the associated macro key, said arithmetic operation controller transfers the sequence of the key code of the associated macro key to said key code decoder to process the sequence therein, and when said comparison means judges that the manager level of the associated operator is lower than the manager level of the manager level check code, said arithmetic operation controller activates said processing means.

2. An electronic cash register comprising a keyboard having macro keys and usual keys for generating a key code when one of said keys is operated, an arithmetic operation controller, clock means for measuring a time at key operation, a memory and display means, said arithmetic operation controller comprising:
setting means for setting in said memory sequences of key codes corresponding to said usual keys as well as a time range check code which requires the key operating time to be checked, as macro key set data corresponding to said macro keys;
comparison means for judging whether or not a time at which one of the macro keys is operated is within an operation allowable time band prescribed by the time range check code corresponding to said macro key;
a key code decoder for sequentially decoding the sequence of the key code; and
processing means for ignoring the sequence of the key code, displaying an error on said display means and terminating processing of the associated macro key,
wherein, when one of the macro keys of said keyboard is operated and when said comparison means judges that the time range check code corresponding to said macro key is within said operation allowable time band prescribed by the time range check code, said arithmetic operation controller transfers the sequence of the key code of the associated macro key to said key code decoder to process the sequence therein, and when said comparison means judges that the time range check code corresponding to said macro key is not within said operation allowable time band, said arithmetic operation controller activates said processing means.

3. An electronic cash register comprising a keyboard having macro keys and usual keys for generating a key code when one of said keys is operated, an arithmetic operation controller, clock means for recognizing a date at the time of key operation, a memory and display means, said arithmetic operation controller comprising:
setting means for setting in said memory sequences of key codes corresponding to said usual keys as well as a date check code which requires the key operating date to be checked, as macro key set data corresponding to said macro keys;
comparison means for judging whether or not date on which one of the macro keys is operated coincides with a date prescribed by the date check code corresponding to said macro key;
a key code decoder for sequentially decoding the sequence of the key code; and
processing means for ignoring the sequence of the key code, displaying an error on said display means and terminating processing of the associated macro key,
wherein, when one of the macro keys of said keyboard is operated and when said comparison means judges that the date at the key operation coincides with the date prescribed by the date check code, said arithmetic operation controller transfers the sequence of the key code of the associated macro key to said key code decoder to process the sequence therein, and when said comparison means judges that the date does not coincide with the date prescribed by the date check code, said arithmetic operation controller activates said processing means.

4. An electronic cash register comprising a keyboard having macro keys and usual keys for generating a key code when one of said keys is operated, an arithmetic operation controller, clock means for recognizing a day of the week at the time of key operation, a memory and display means, said arithmetic operation controller comprising:
setting means for setting in said memory sequences of key codes corresponding to said usual keys as well as a day of the week check code which requires the key operating day of the week to be checked, as macro key set data corresponding to said macro keys;
comparison means for judging whether or not a day of the week on which one of the macro keys is operated coincides with a day of the week prescribed by the day of the week check code corresponding to said macro key;
a key code decoder for sequentially decoding the sequence of the key code; and
processing means for ignoring the sequence of the key code, displaying an error on said display means and terminating processing of the associated macro key,
wherein, when one of the macro keys of said keyboard is operated and when said comparison means judges that the day of the week at the key operation coincides with the day of the week prescribed by the day of the week check code, said arithmetic operation controller transfers the sequence of the key code of the associated macro key to said key code decoder to process the sequence therein, and when said comparison means judges that the day of the week does not coincide with the day of the week prescribed by the day of the week check code, said arithmetic operation controller activates said processing means.

5. An electronic cash register comprising a keyboard having macro keys and usual keys for generating a key code when one of said keys is operated, an arithmetic operation controller, a printer for printing registered data, a memory and display means, said arithmetic operation controller comprising:
setting means for setting in said memory sequences of key codes corresponding to said usual keys as well as a print mode assignment code which requires assignment of a print mode of said printer, as macro key set data corresponding to said macro keys;
control means for controlling said printer in the corresponding print mode; and
a key code decoder for sequentially decoding the sequence of the key code;
wherein, when one of the macro keys having said print mode assignment mode set thereto is operated, said control means controls said printer in the print mode and transfers the sequence of the key code corresponding to the associated macro key to said key code decoder to process the sequence therein.

6. An electronic cash register comprising a keyboard having macro keys and usual keys for generating a key code when one of said keys is operated, an arithmetic operation controller, a receipt printer for printing registered data as a receipt, a memory and display means,
said arithmetic operation controller comprising:

setting means for setting in said memory sequences of key codes corresponding to said usual keys as well as a receipt check code which requires a receipt ready state of said receipt printer to be checked, as macro key set data corresponding to said macro keys;

inspection means for checking the receipt ready state of said receipt printer;

a key code decoder for sequentially decoding the sequence of the key code; and processing means for ignoring the sequence of the key code, displaying an error on said display means and terminating processing of the associated macro key, wherein, when one of the macro keys having said receipt check code set thereto is operated, said inspection means checks the receipt ready state of said receipt printer, and when said inspection means confirms that said receipt gets ready in the printer, the inspection means transfers the sequence of the key code corresponding to the associated macro key to said key code decoder to process the sequence therein while, when the inspection means confirms that said receipt does not get ready in the printer, the inspection means activates said processing means.

7. An electronic cash register comprising a keyboard having macro keys and usual keys for generating a key code when one of said keys is operated, an arithmetic operation controller, means for releasing a drawer in which sales money is placed, a memory and display means, said arithmetic operation controller comprising:

setting means for setting in said memory sequences of key codes corresponding to said usual keys as well as a drawer state check code which requires confirmation of the release state of said drawer, as macro key set data corresponding to said macro keys;

inspection means for checking the release state of the drawer;

a key code decoder for sequentially decoding the sequence of the key code; and processing means for ignoring the sequence of the key code, displaying an error on said display means and terminating processing of the associated macro key, wherein, when one of the macro keys having said drawer state check code set thereto is operated, said inspection means checks the drawer release state of said drawer, and when said inspection means confirms that said drawer is in its closed state, the inspection means transfers the sequence of the key code corresponding to the associated macro key to said key code decoder to process the sequence therein while, when the inspection means confirms that said drawer is in said release state, the inspection means activates said processing means.

8. An electronic cash register comprising a keyboard having macro keys and usual keys for generating a key code when one of said keys is operated, an arithmetic operation controller, a clock means for recognizing a date and a day of the week at the time of key operation, a memory and display means, said arithmetic operation controller comprising:

setting means for setting in said memory sequences of key codes corresponding to said usual keys as well as a receipt check code which requires a receipt ready state of said receipt printer to be checked, as macro key set data corresponding to said macro keys;

comparison means for judging whether or not said date and day of the week on which the macro key is operated coincide with a date and a day of the week prescribed by date and day of the week check codes corresponding to the associated macro key;

a key code decoder for sequentially decoding the sequence of the key code; and processing means for ignoring the sequence of the key code, displaying an error on said display means and terminating processing of the associated macro key, wherein, when one of the macro keys on said keyboard is operated and when said comparison means judges that at least one of the date and day of the week at the key operation coincides with the date and day of the week prescribed by said date and day of the week check code, said arithmetic operation controller transfers the sequence of the key code corresponding to the associated macro key to said key code decoder to process the sequence therein while, when the comparison means judges that the date and day of the week at the key operation coincide both with the date and day of the week prescribed by said date and day of the week check code respectively, said arithmetic operation controller activates said processing means.

9. An electronic cash register comprising a keyboard having a plurality of macro keys, an arithmetic operation controller having a key code decoder, a memory and display means for displaying an error thereon, wherein, when one of said keys on said keyboard is operated, a key code corresponding to the operated key is generated and supplied to said arithmetic operation controller, said memory has a macro key information area for storing therein macro key information corresponding to said macro keys, said arithmetic operation controller stores in said macro key information area macro key information including key code information indicative of a sequence of the key codes to be sequentially executed when the respective macro keys are specified and controls to cause said key code decoder to convert said key codes and said key code information into executable instructions, said electronic register further comprises means for recognizing a state of the electronic register, said macro key information further includes a check code for check of conditions determining permission or non-permission of execution of operation of each macro key specified, said arithmetic operation controller when receiving the key code corresponding to any one of the macro keys from said keyboard reads out said key code information corresponding to the associated macro key and said check code from said area, compares the conditions specified by said check code with the state of the electronic register recognized by said recognition means, controls to cause said key code decoder to convert said key code information into the executable instruction when said register state satisfies said conditions, and displays an error on said display unit, ignores the key code and waits for a next input when the register state fails to satisfy the conditions.

10. An electronic cash register as set forth in claim 9, wherein said recognition means has clock function of informing when to operate said register, and said check code is a time check code used to prescribe a time when the operation of the register based on the corresponding macro key is enabled.

11. An electronic cash register as set forth in claim 10, said time being an hour and a minute.

12. An electronic cash register as set forth in claim 10, said time being a day of the month.

13. An electronic cash register as set forth in claim 10, said time being a day of the week.

14. An electronic cash register as set forth in claim 10, wherein said time is a day of the month and a day of the week, and the register is operated at the time of a coincidence of both of said days.

15. An electronic cash register as set forth in claim 9, further comprising a data printer for printing registered data when said printer is put in a print mode, and wherein said recognition means detects and informs the print mode of said data printer and said check code is a print mode assignment code including an instruction indicative of change to the print mode when the data printer is not put in said print mode.

16. An electronic cash register as set forth in claim 9, further comprising a receipt printer for printing registered data on a receipt to be used as a tax payment material when said printer is put in a receipt ready mode, and wherein said memory further stores therein said registered data, said recognition means detects and informs the receipt ready mode of said receipt printer, and said check code is a receipt ready check code for detection of said receipt printer in said receipt ready mode.

17. An electronic cash register as set forth in claim 9, further comprising a drawer and means for releasing said drawer, and wherein said recognition means detects and informs a release state of said drawer and said check code is a drawer state check code which requires confirmation of the drawer in said release state.

18. An electronic cash register as set forth in claim 9, wherein said memory further stores therein recognition codes IDs and manager levels for respective operators, said recognition means forms part of said arithmetic operation controller and stores therein a recognition code ID of an operator entered by his own, said check code is a manager level check code specifying the manager level to allow said macro key operation, and when said manager level check code is read out, the read manager level check code is compared with the manager level corresponding to the ID entered by said operator.

19. An electronic cash register as set forth in claim 9, wherein said recognition means has two or more of functions including a clock function of informing when said register is operated, a function of detecting and informing a print mode of a data printer, a function of detecting and informing a receipt ready mode of a receipt printer, a function of detecting and informing a release state of a drawer, and a function of storing a recognition code ID entered by an operator, and wherein said check codes are more than two selected from the group of check codes including a time check code prescribing when the operation of the register is enabled, a print mode assignment code including an instruction indicative of change to said print mode when said data print is not in the print mode, a receipt ready check code for detection of said receipt printer in said receipt ready mode, a drawer state check code requiring confirmation of said drawer in said release state, and a manager level check code specifying a manager level to allow the operation of said macro key.

* * * * *